United States Patent [19]

Nelson et al.

[11] Patent Number: 4,755,988
[45] Date of Patent: Jul. 5, 1988

[54] DATA COMMUNICATIONS SWITCHING DEVICE HAVING MULTIPLE SWITCHES OPERATING AT PLURAL SELECTABLE DATA RATES

[75] Inventors: Gary A. Nelson, Irvine; Stillman F. Gates, Capistrano Beach, both of Calif.

[73] Assignee: CXC Corporation, Irvine, Calif.

[21] Appl. No.: 582,182

[22] Filed: Feb. 21, 1984

Related U.S. Application Data

[63] Continuation-in-part of Ser. No. 491,551, May 4, 1983, Pat. No. 4,587,651.

[51] Int. Cl.$^4$ .......................... H04J 3/00; H04J 3/16; H04Q 11/04
[52] U.S. Cl. ........................................ 370/84; 370/85; 370/89; 370/118
[58] Field of Search .................. 370/84, 79, 89, 86, 370/85, 88, 79, 94, 60, 118, 58

[56] References Cited

U.S. PATENT DOCUMENTS

| | | | |
|---|---|---|---|
| Re. 28,811 | 5/1976 | Pierce . | |
| 3,922,497 | 4/1976 | Artom et al. . | |
| 3,961,139 | 6/1976 | Bowman et al. . | |
| 4,019,176 | 4/1977 | Cour et al. . | |
| 4,081,612 | 3/1978 | Hafner . | |
| 4,205,326 | 5/1980 | Porter et al. . | |
| 4,251,880 | 2/1981 | Baugh et al. ......................... | 370/80 |
| 4,262,357 | 4/1981 | Shima . | |
| 4,271,507 | 6/1981 | Gable et al. . | |
| 4,293,948 | 10/1981 | Soderblom ............................ | 370/90 |
| 4,307,378 | 12/1981 | Clark . | |
| 4,314,233 | 2/1982 | Clark . | |
| 4,317,197 | 2/1982 | Ulug . | |
| 4,347,498 | 8/1982 | Lee et al. . | |
| 4,358,845 | 11/1982 | De Passoz . | |
| 4,370,744 | 1/1983 | Hirano et al. . | |
| 4,375,097 | 2/1983 | Ulug . | |
| 4,375,681 | 3/1983 | Abbott et al. . | |
| 4,377,860 | 3/1983 | Godbole . | |
| 4,383,314 | 5/1983 | Tam . | |
| 4,408,323 | 10/1983 | Montgomery . | |
| 4,413,258 | 11/1983 | Quick, Jr. et al. . | |
| 4,430,651 | 2/1984 | Bryant et al. . | |
| 4,445,213 | 4/1984 | Baugh et al. . | |
| 4,453,705 | 3/1984 | Stevens . | |
| 4,494,232 | 1/1985 | Dambrackas et al. . | |
| 4,528,661 | 7/1985 | Bahr et al. . | |
| 4,547,877 | 10/1985 | Lehman et al. ...................... | 370/84 |
| 4,587,651 | 5/1986 | Nelson et al. ....................... | 370/88 |
| 4,597,077 | 6/1986 | Nelson et al. ....................... | 370/88 |
| 4,598,397 | 7/1986 | Nelson et al. ..................... | 370/110.1 |
| 4,679,191 | 7/1987 | Nelson et al. ....................... | 370/84 |

Primary Examiner—Douglas W. Olms
Assistant Examiner—Curtis Kuntz
Attorney, Agent, or Firm—Knobbe, Martens, Olson & Bear

[57] ABSTRACT

A large scale integrated circuit device is disclosed that can be used as a component in a variable bandwidth branch exchange system or for other applications utilizing programmable network switching. The device contains a plurality of duplex per line switches (PLS). Each PLS interfaces between serial signal streams which may operate at various rates. Date transfers are programmable to occur at variable times with reference to the information highway timing and are programmable in length. The device may be controlled and monitored by an external device, and can optionally transfer control and status information between an external control device and one or more station devices.

47 Claims, 30 Drawing Sheets

BLOCK DIAGRAM QPLS

BLOCK DIAGRAM QPLS

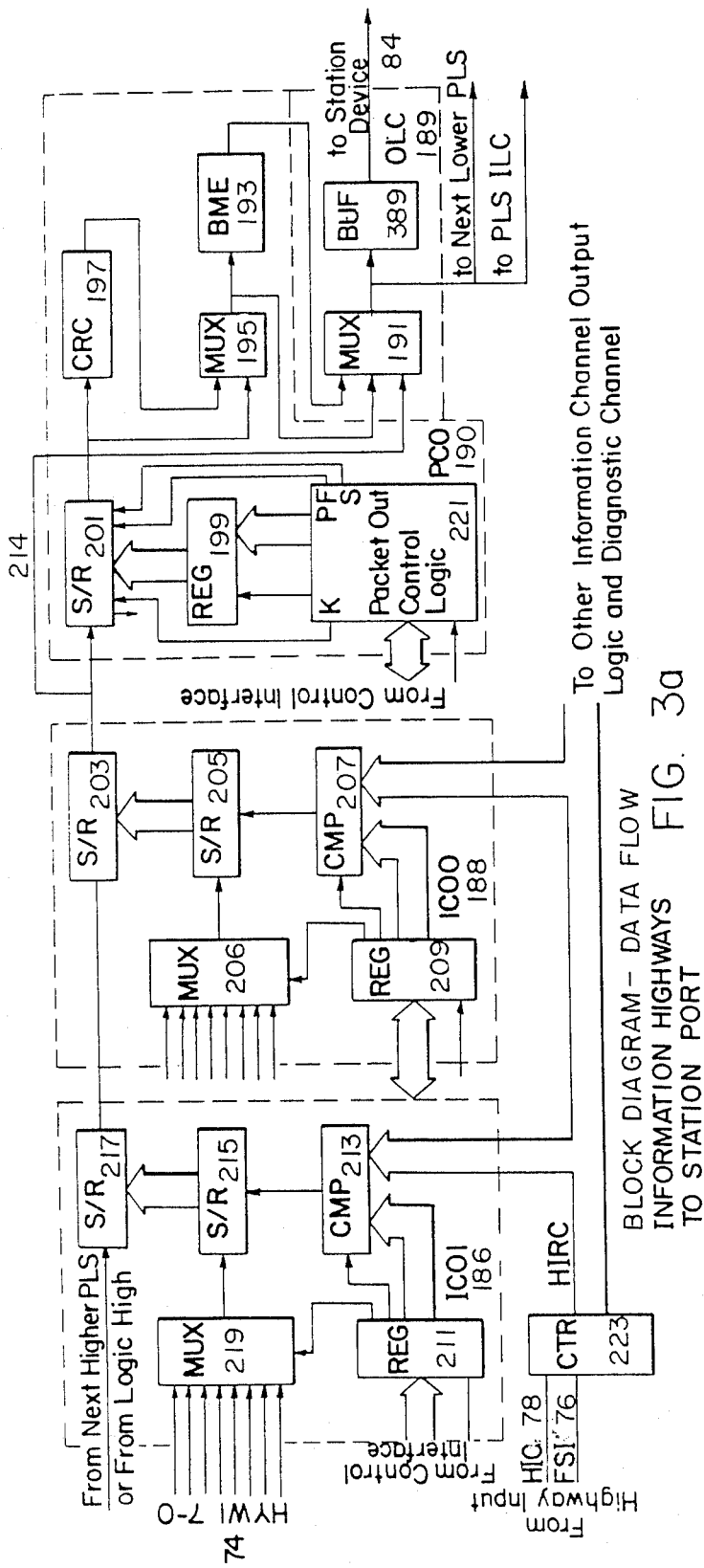
FIG. 3a BLOCK DIAGRAM—DATA FLOW INFORMATION HIGHWAYS TO STATION PORT
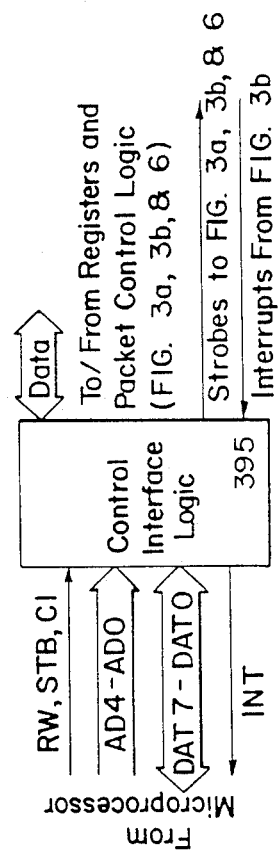
FIG. 4

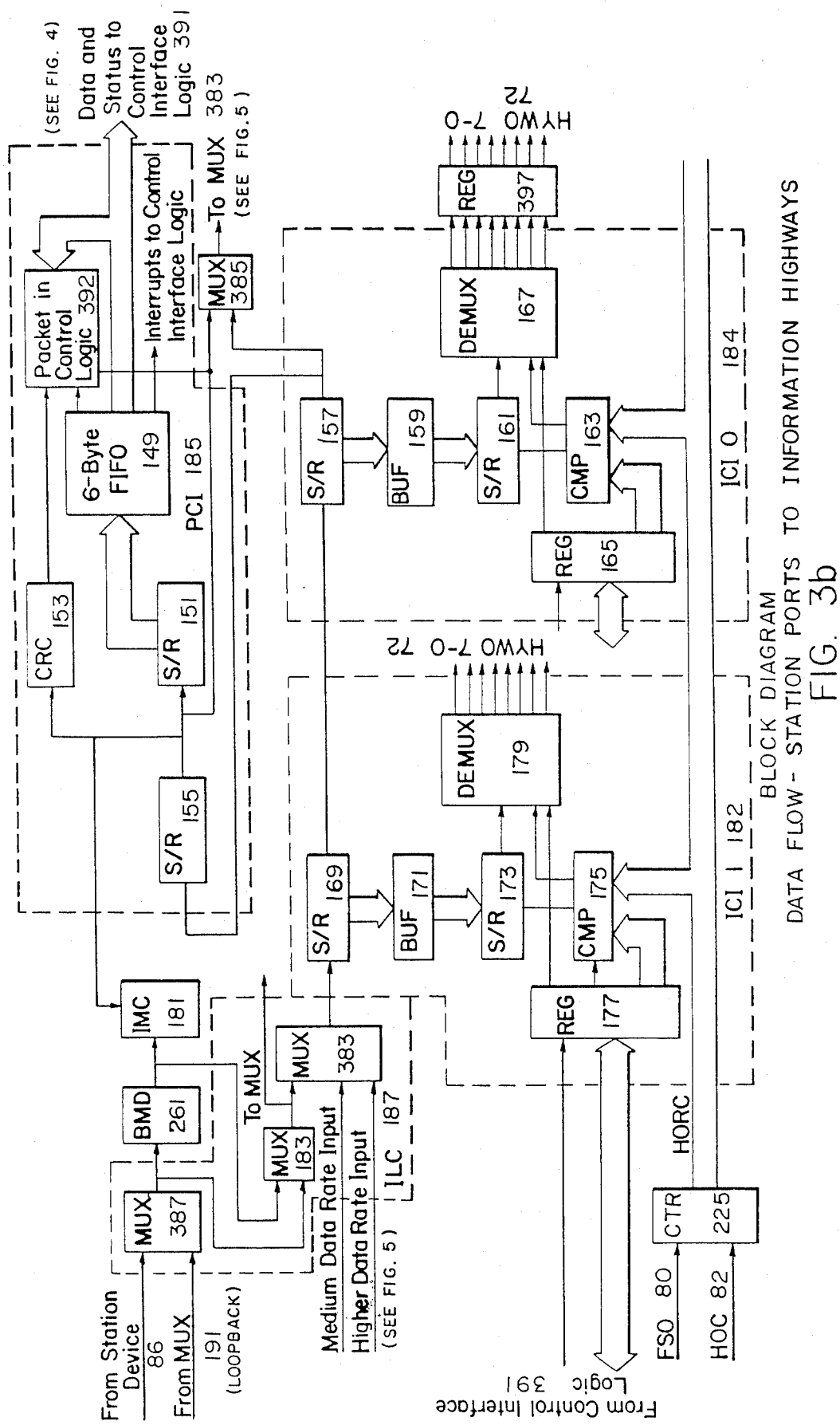
FIG. 3b BLOCK DIAGRAM DATA FLOW - STATION PORTS TO INFORMATION HIGHWAYS

FIG. 6 DIAGNOSTIC CHANNEL BLOCK DIAGRAM

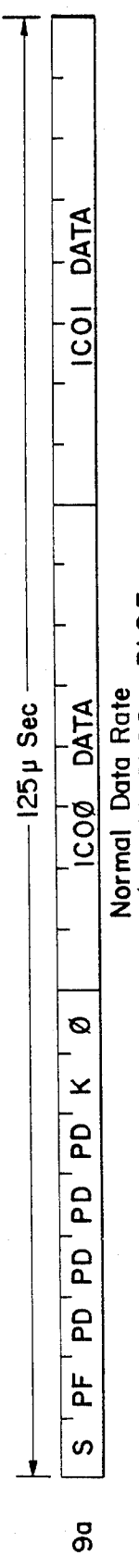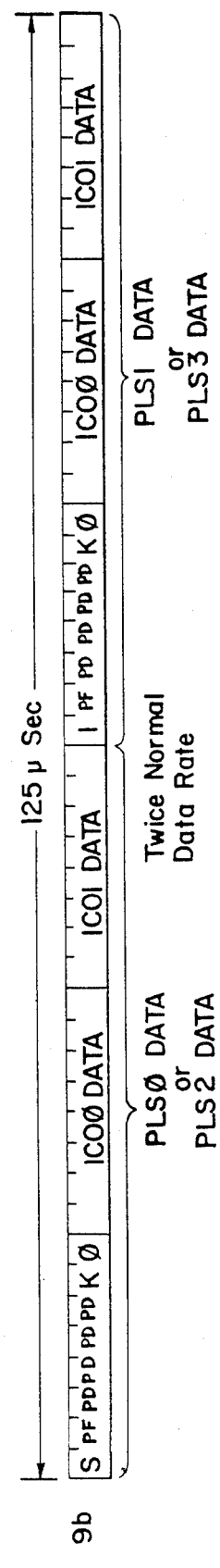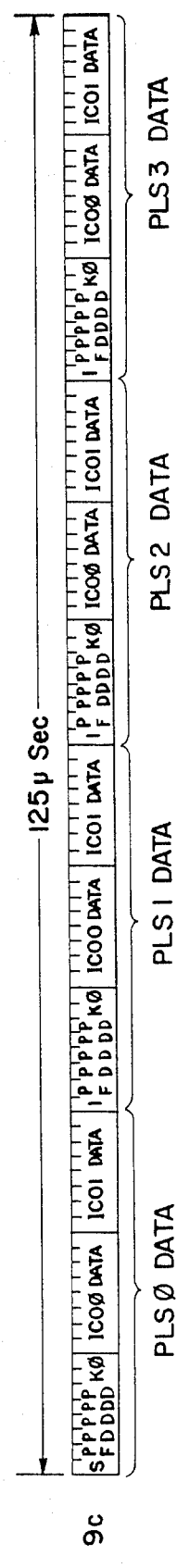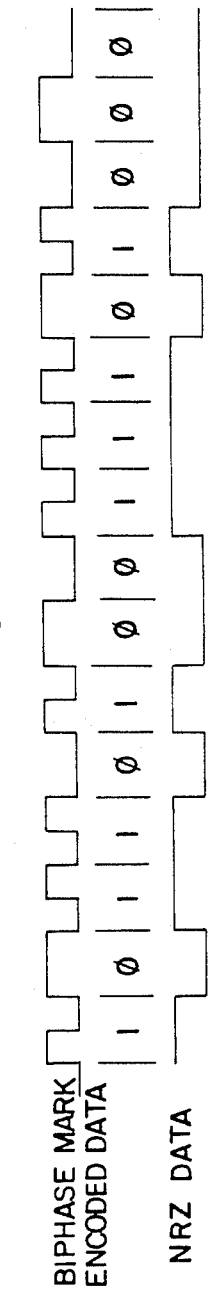
FIG. 9
FIG. 10

FIG. 11

CIRCUIT SHEET REFERENCE

12. INFO-CHANNEL OUT (TO STATION PORT)(ICO*)
13. INFO CHANNEL IN (FROM STATION PORT)(ICI*)
14. PACKET CHANNEL OUT (PCO*)
15. PACKET CHANNEL IN (PCI*)
16. CRC CIRCUIT (CCITT)
17. OUTPUT LINE CTL (OLC)
18. INPUT LINE CTL (ILC)
19. LINE CLOCK RATE GEN/SEL (CGRS)
20. INT CTL/TIMING/BUFFERS
21. MODE REG/STATUS
22. BIPHASE MARK ENCODER/DECODER (BME/BMD)
23. INPUT MESSAGE CTL (IMC)
24. I/O DECODE/CONTROL
25-31 REFERENCE TIMING

| SIGNAL NAME | DIE PAD | DIP PIN |
|---|---|---|
| HYWO0 | — | 11 |
| 1 | — | 12 |
| 2 | — | 13 |
| 3 | — | 14 |
| 4 | — | 15 |
| 5 | — | 16 |
| 6 | — | 17 |
| 7 | — | 18 |
| HYWI0 | — | 39 |
| 1 | — | 40 |
| 2 | — | 41 |
| 3 | — | 42 |
| 4 | — | 43 |
| 5 | — | 44 |
| 6 | — | 45 |
| 7 | — | 46 |
| LO0 | — | 06 |
| 1 | — | 07 |
| 2 | — | 08 |
| 3 | — | 09 |
| LI0 | — | 02 |
| 1 | — | 03 |
| 2 | — | 04 |
| 3 | — | 05 |

| SIGNAL NAME | DIE PAD | DIP PIN |
|---|---|---|
| FSO | — | 25 |
| HOC | — | 26 |
| FSI | — | 38 |
| HIC | — | 37 |
| R/W | — | 28 |
| STB | — | 27 |
| AD0 | — | 23 |
| 1 | — | 22 |
| 2 | — | 21 |
| 3 | — | 20 |
| 4 | — | 19 |
| LC | — | 10 |
| CI | — | 47 |
| INT | — | 48 |
| DAT0 | — | 36 |
| 1 | — | 35 |
| 2 | — | 34 |
| 3 | — | 33 |
| 4 | — | 32 |
| 5 | — | 31 |
| 6 | — | 30 |
| 7 | — | 29 |
| VCC | — | 01 |
| VSS | — | 24 |

\* VARIABLE = 3-0    \*\* VARIABLE = IF - 00

OUTPUT LINE CONTROL

LINE IN CONTROL
187

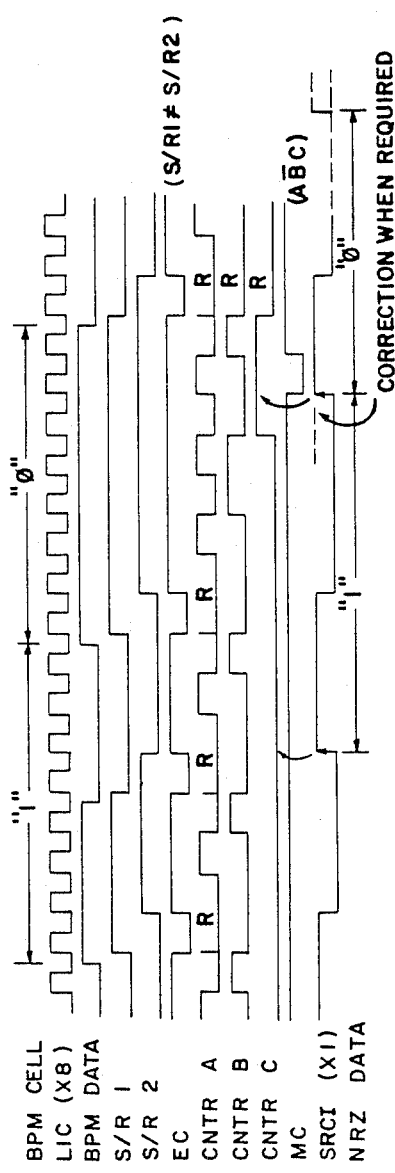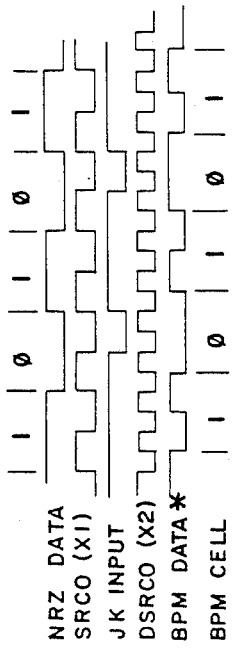
FIG. 29

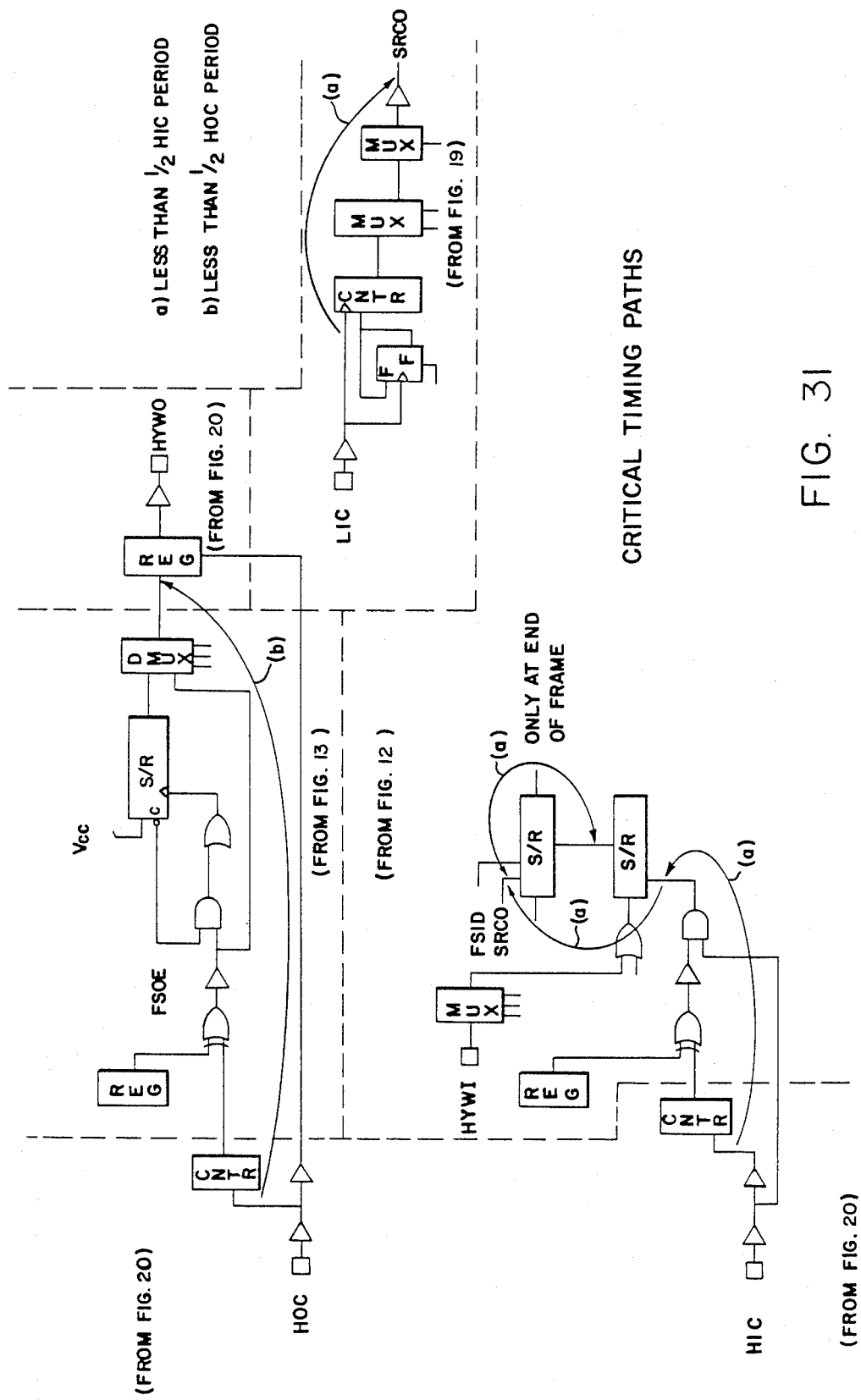
FIG. 31 CRITICAL TIMING PATHS

DATA COMMUNICATIONS SWITCHING DEVICE HAVING MULTIPLE SWITCHES OPERATING AT PLURAL SELECTABLE DATA RATES

This application is a continuation-in-part of U.S. patent application Ser. No. 491,551, filed on May 4, 1983, now U.S. Pat. No. 4,587,651, issued on May 6, 1986.

BACKGROUND OF THE INVENTION

The present invention relates to the transmission and reception of digital information on multiple lines and at multiple data rates. More particularly, the present invention relates to a device for switching between data communications lines and the like.

As the complexity of data communications networks increases, the need for alternative methods of interfacing the various devices on the networks becomes critical. If one first considers the simplest interconnection between two devices such as two telephones or such as a computer and a terminal, it is evident that a connection between the two devices can be accomplished quite easily. For example, communications can be established between devices with one wire, such as was done with an early telegraph system. Though each device had simultaneous access to the one wire, typically connecting a remote junction box to a central switching location, only one device at a time could use the wire to send messages to other devices. When the device relinquished the line, another device could then use the line to send messages. Since only one device could use the line to send at any one time, the number of messages which could be sent would be quite low. Thus, the data rate of the systems was low. Obviously, some protocol was established for determining which device had the use of the line at any time. Considering the relative simplicity of such a system and the low data rates, and the fact that the system was most likely under the jurisdiction of one entity, such as the telegraph company, the protocol could be as simple as listening to determine whether the line was in use.

When the number of the devices on a system increased and the users became relatively independent, the number of messages to be sent at any one time increased accordingly. A good example of this would be a telephone system. The users in a given area would not all want to be on the same line where each would have to wait until the line to the central switching location was not in use before initiating a message. As was frequently the case, a large number of users could want to send more messages than such a system could handle in a given time frame. Thus, except in areas where this "party line" method was more cost effective and where the number of messages per unit time was low, the "party line" method was replaced with the method of running a communications line from each telephone or other communications device to a central location, thereby replacing the common line to the remote junction box. At the central location, a communications line from one device could be connected to the communications line from another device to which communications was to be established. This could be done manually as with an operator at switchboard, electromechanically such as in a complex telephone crossbar system, or under computer control as is done in modern telephone networks.

Although the method of running communications lines from each user to a central location has many advantages over the party line method, it has the distinct disadvantage of requiring a communications line from each device to a central location. Thus, although two devices might be relatively close to each other compared to the distance to the central location, communications between the two devices would be routed through the central location. In a large, widespread network this would require substantial expenditures for the communications lines. Furthermore, although a device might only be sending and/or receiving messages during a small portion of a given time frame, a dedicated communications line would A/ASR/S be necessary to connect the device to a central location. During the unconnected time, a valuable resource would be idle. If another device has to be added to an existing system a new dedicated communications line would have to be added to connect the device to the central location. It is obvious that this method of interconnecting communications devices has substantial drawbacks when one considers the physical and economical problem of placing the number of communications lines required for a large communications network.

One solution that has developed in the prior art for the problem is the use of time division multiplexing of digital data. Unlike the previously described method, in a system which uses time division multiplexing a communications line is not provided from each device to a central location. Instead, each device is connected to other devices relatively close to it. Thus, there would be a considerable savings in the number of communications lines needed to interconnect the devices in a network. All the devices in a communications network may be connected in a ring, chain or the like, with each device connected to two other devices, or to one other device in the case of a device at the end of a chain connection. One such ring communication system is described in co-pending U.S. patent application Ser. No. 491,551 (now U.S. Pat. No. 4,587,651, issued on May 6, 1986), assigned to the common assignee, the teachings of which are incorporated by reference herein.

Although it might appear that a device would then only be able to communicate with a device to which it has a direct connection, each device can communicate with all other devices connected to the network. The network ring or chain is continuous, with each device either tapping the ring or chain, or forming a part of the ring or chain. It would also appear that the devices are connected much the same as a party line much or the previously described telegraph system. Although the devices are physically connected to the same line at any one time, and do not transmit data at the same time, the devices do not have to wait until other devices complete their messages before sending their own messages. Communication between devices can typically be accommodated using only a portion of the time available in each cyclical message frame, thereby allowing the ring to communicate numerous messages within a given period.

Multiple devices may be connected to a communications line in a ring or chain configuration or the like. In order to coordinate communication between devices in a ring there need be only one or two connections to a controlling unit at some point in the ring or chain. That configuration substantially reduces the need for large amounts of cabling directed to the same location. Moreover, the controlling device no longer has to be able to interconnect the lines from each of the message devices and, therefore, may be less complex. When time division multiplexing is employed the communications line is not assigned solely to one device until the completion of a message. Instead, the line is assigned to each device for a relatively short period of time, typically referred to as a time slot. Other devices in the communications network are likewise assigned to time slots. The time slots occur periodically on the communications line, and are repeated at a frequency such that the device can send or receive data continuously at its normal data rate. A message frame is comprised of all the time slots available for devices. Since each device is assigned to one or more periodic time slots, each device can continuously communicate on the communications line while other devices are similarly communicating via their assigned time slots. Additional devices can be added to the exemplary system by connecting it in the ring or the like without having to run a new communications line to a central location. Thus, many of the physical and economic constraints are no longer a barrier.

In an exemplary system utilizing time division multiplexing, the communications devices might operate at a data rate of 1000 BPS. A communication line operating at 100,000 BPS would be able to transfer messages to or from this device and 99 similar devices in a message frame which has a 1000 hertz repetition rate. The data from each device would be assigned to each of the 100 one-bit time slots in the message frame. Other configurations could assign the time slots for devices in multiple-bit groups.

In either the contemporary centralized network or the contemporary ring network, however, devices can only be added to the system if there are time slots available in a message frame. Therefore, it would be difficult, if not impossible, to add the 101st device to the exemplary system if the available time slots are permanently assigned to other devices. In many communications applications the devices present in the system probably would not all be communicating at the same time. Thus, there could be a substantial number of the time slots idle at any given time. However, a typical prior art communications system would not have the flexibility to reassign the idle time slots to additional devices to take advantage of the available time slots. Although increasing the number of time slots would accommodate extra devices, if possible to do so, the incremental increase in the number of time slots might be large compared to the number of devices to be accommodated, and therefore could result in a large number of unused time slots. Communication of information between data communications devices is typically accomplished with digital data. Essentially, the information is transferred between the devices as a stream of information packets which are represented by voltage levels on the communications line. A "bit" is the minimum amount of information which can be represented by either a high or low voltage level. Information is transferred between communications devices as sequential combinations of bits.

A voice signal can be transferred without any appreciable loss of quality as a stream of 64,000 data bits per second (64,000 BPS). The voice signal is sampled at periodic intervals by the sending device; the samples are converted to a digital format; the digital data is transferred to the receiving device as a stream of data bits; and the digital data is converted to a voice signal by the receiving device.

In comparison to an audio signal, the transmission of character information between a computer and a high-speed video terminal can require data transmission rates in the range of 19,200 BPS. On the other hand, a typical teletypewriter terminal might only require data at a rate of 110 to 300 BPS to operate at full capacity.

Typically a data communications network needs to be capable of handling data rates from 110 BPS to 19,200 BPS, and under same circumstances up to 1,000,000 BPS or more.

Another problem with the typical prior art system utilizing time division multiplexing is that devices operating at different data rates cannot be accommodated. Although the time slot allocations in a message frame might be adequate for most devices in a system, there is often a need for other devices operating at higher or lower data rates. For example, a system might consist primarily of digitized telephones operating at 64,000 BPS. If a typical network is configured to accommodate the telephones, it might not be able to accommodate the communications to and from a terminal device operating at 19,200 BPS. Furthermore, the terminal device might be such that it operates at different rates when communicating with different devices. Thus, a time slot assignment which accommodates a 19,200 BPS data rate would be partially unused if the terminal device were to operate at 9600 BPS or a lower data rate. Similarly, a time slot assigned to a terminal device operating at 9600 BPS would not be able to accommodate the same device operating at 19,200 BPS.

As can be readily seen from the foregoing, the implementation of time division multiplexing in the prior art accomplished a significant savings in physical resources in a typical communications network. However, the prior art systems have serious limitations with regard to flexibility in light of the ever increasing demands on data communications systems, both with regard to the increases in the quantity of devices to be connected to a system and with regard to widespread variations in the communications rates used by those devices.

SUMMARY OF THE INVENTION

The Quad Per Line Switch (QPLS) described herein solves the problems related to the use of switching devices in time multiplexed communications networks for allocating communications resources. Unlike the prior art switches, the QPLS has the capability of dynamically allocating communications time slots to communications devices connected to it.

In a typical application, the QPLS can be connected to telephones and terminal devices and will provide the means of connecting those devices to the network communications lines. In an exemplary system having 100 telephones assigned to each of 100 available time slots, one would typically find that only a small percentage, such as 10 to 20 percent, of the telephones would be in use at any one time. Thus, 80 to 90 percent of the time slots would typically be idle. If the idle time slots could be reassigned when not in use, the number of telephones which could be accommodated with the available time slots could be increased substantially—perhaps to 500 or 1,000—depending upon the statistical utilization of the telephones. If, for example, a telephone connected to a QPLS is on-hook, the telephone would not be allocated a time slot since no information is being transferred. The unused time slots are available for allocation to other devices connected to this QPLS or to other QPLS's. When the telephone is activated a time slot would be allocated to provide a communications route to the telephone and a time slot would be allocated to provide a communications route from the telephone. If the telephone was part of a multifunction unit, the number of bits in the allocated time slots might be varied if the unit is switched from telephone use to use as a data terminal or the like. Thus, the device might be provided with a time slot adequate for an 64,000 BPS data rate as a telephone, and then provided with a time slot adequate for a 19,200 BPS data rate as a data terminal. Without the flexibility of the QPLS, the ability to dynamically reallocate the time slots would not be available.

The QPLS has further dynamic flexibility since it can transfer data between communications devices and time slots on any of a plurality of communications highways. Thus, the time slots available for a communications device are not limited to those available on any one communications line.

The QPLS may be implemented in a data communications system, such as that described in co-pending application for DISTRIBUTED VARIABLE BANDWIDTH SWITCH FOR VOICE, DATA AND IMAGE COMMUNICATIONS (Ser. No. 491,551), now U.S. Pat. No. 4,587,651, issued on May 6, 1986, "Speaker Phone" (Ser. No. 501,388) now abandon, "Microtelephone Controller" (Ser. No. 582,069, now U.S. Pat. No. 4,598,397, issued on July 1, 1986), filed contemporaneous with the filing of this application, all assigned to the same assignee as the present invention. The disclosures in these references are incorporated in the present application.

Devices constructed in accordance with the preferred embodiment of this invention can switch digital information between a plurality of high speed information input highways and a plurality of high speed information output highways, or between high speed information highways and lower speed device channels under control of a local microprocessor or other external control means. Unlike other devices, the invention allows the input data source, the input data rate, the channel selection, the channel bandwidth, the output data rate, the output destination, and the data format to be selected within the device under external program control. These devices may also write data provided from an external control means to a plurality of information highway outputs and read data from a plurality of information highway inputs for access by an external control means for communication or diagnostic purposes. Alternatively, the device may be used to switch information from a plurality of information highways inputs to a plurality of information highway outputs. The invention may also communicate with synchronous lower speed device channels utilizing error monitored data sequences without requiring external synchronization circuits.

Thus, the QPLS provides the flexibility needed to dynamically configure a communications network to the constantly changing and increasing demands of a modern voice, data and image communications system.

BRIEF DESCRIPTION OF THE INVENTION

In the preferred present embodiment, the Quad Per Line Switch (QPLS) consists of four essentially identical Per Line Switches (PLS). Each PLS operates independently and each can switch two variable bandwidth information channels of data from independent information highway inputs, carrying network signal traffic, to an external station device or to independent information highway outputs. The data from the external station device can be switched via two variable bandwidth channels onto independent information highway outputs. The channel and bandwidth selections are all completely independent of each other. In the present embodiment, sixteen independent information highways are available for use by all PLS's. In the preferred embodiment, each PLS contains a packet channel for transferring control and general purpose data to and from a station device. Packet data in both directions is monitored for errors utilizing cyclic redundancy generating and checking circuits.

The QPLS can be configured under program control such that the PLS's operate in pairs to transmit data to and receive data from two station devices at twice the normal data rate. The PLS's can also be configured to operate as a single switching unit to transfer data between the information highways and a single station device at four times the normal data rate. This reconfiguration may also allow reduction of the number of interconnect lines from four to two or to one and still support four station devices.

When operating with local station devices, that is devices connected on the same circuit board as the QPLS, the PLS's can transfer data to and from the station devices in synchronization with the information highways. When operating with remote station devices, that is devices connected to the QPLS circuit board by transmission lines, the PLS's can operate synchronously with the devices, transmit to them in synchronization with the information highways, and receive from the devices by self-synchronization with each device. The QPLS can also switch nine channels of data between information highway inputs and outputs without transferring data to or from a station device. When the QPLS Is operating in this manner, information highway data may be time compressed or decompressed by setting the data rate on the information highway outputs to be a multiple or submultiple of the data rate on the information highway inputs.

BRIEF DESCRIPTION OF THE DRAWINGS

FIG. 4 is a block diagram of the control interface logic.

FIGS. 9(a)-(c) are timing diagrams exemplifying the data transfer formats to a station device in the remote mode.

FIG. 10 is a timing diagram illustrating an exemplary data encoding format applied to nonreturn-to-zero (NRZ) data.

FIGS. 11-31 are detailed logic diagrams and associated timing diagrams representing individual logic elements that may be included in the modules described and illustrated in connection with the previous drawings.

DETAILED DESCRIPTION OF THE DRAWINGS

Figure 1:
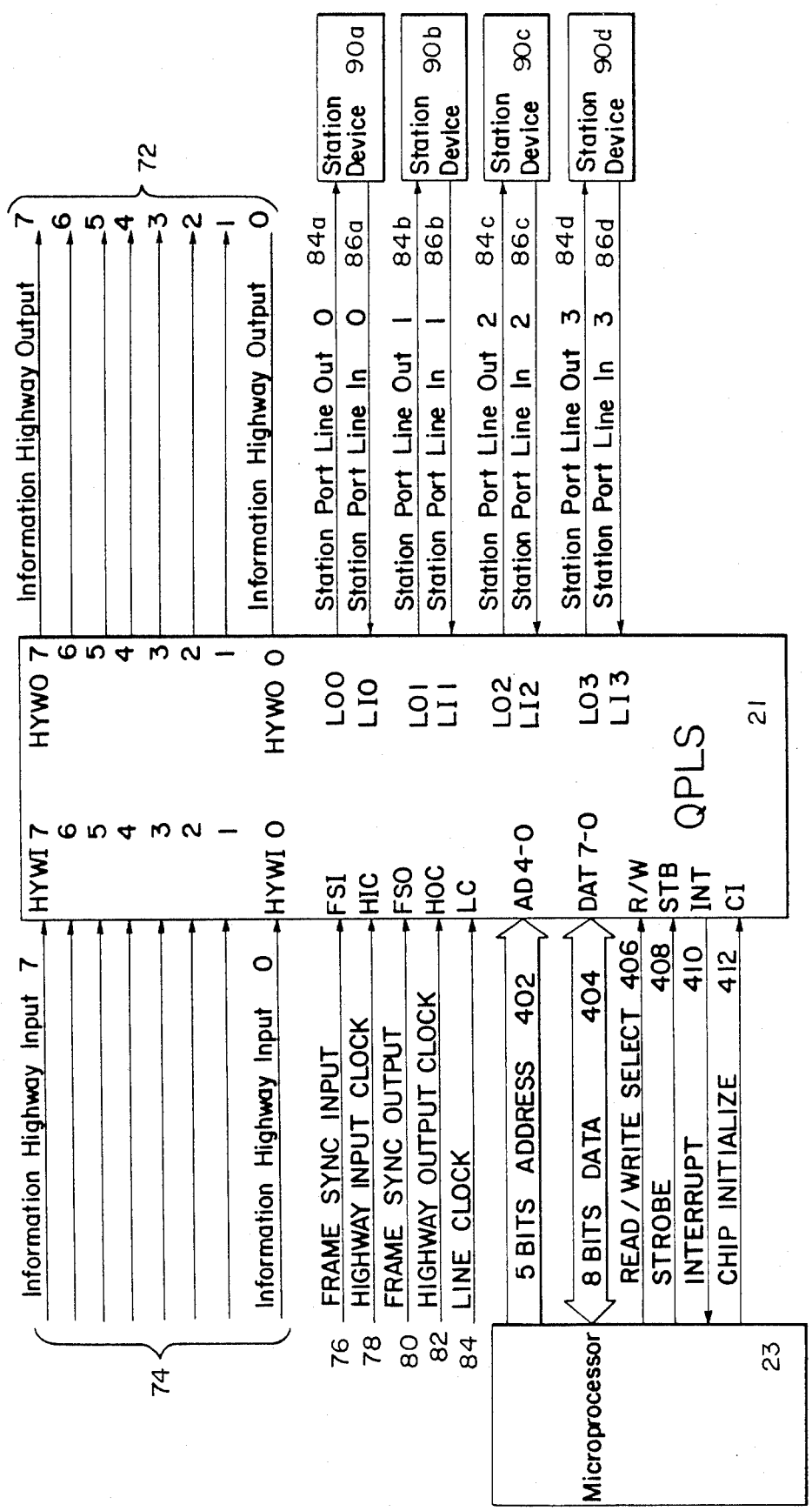
FIG. 1 is a wiring diagram of the Quad Per Line Switch element showing the external connections.

FIG. 1 shows a wiring diagram of the Quad Per Line Switch (QPLS) 21 in its presently preferred embodiment. The QPLS may be advantageously manufactured as a 48-pin large scale integrated circuit having the inputs and outputs shown.

The operation of the QPLS can be more easily envisioned by an understanding that the QPLS selectively routes data between one or more of the information highways (72 and 74) and the station devices 90. As was described in the background and summary of the invention, the QPLS routes the data on the basis of time division multiplexing. The particular selection and timing of data transfers between the information highways and the station devices is controlled by an external control means such as microprocessor 23 shown in FIG. 1.

DESCRIPTION OF THE DATA TRANSFER FORMATS AND QPLS CONFIGURATIONS

Figure 7:
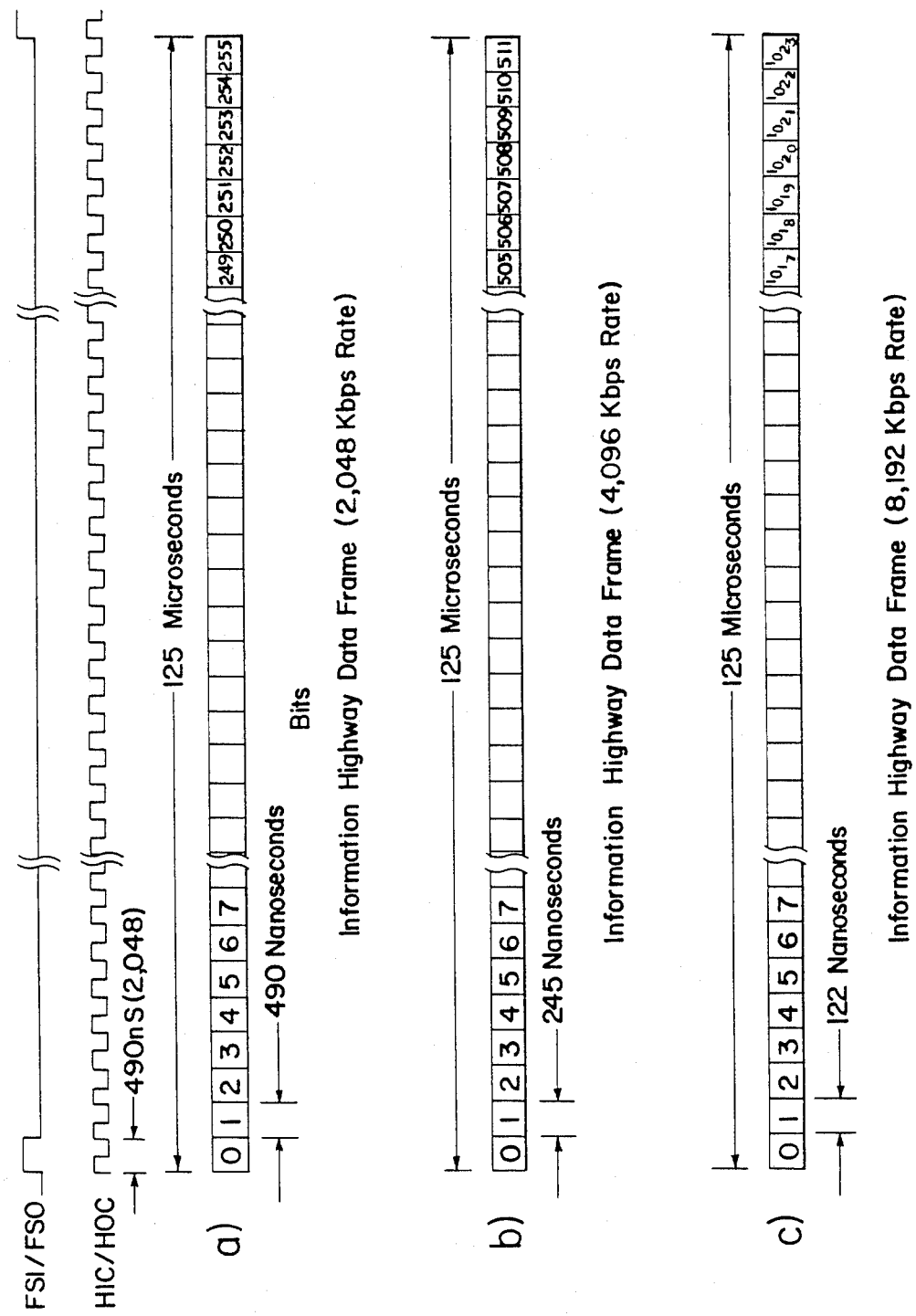
FIGS. 7(a)-(c) are timing diagrams exemplifying the relationship between the information highway data rates.

Since the QPLS is used to transfer data to and from information highways, a brief description of the information highways will be presented before proceeding with the detailed description of the invention. In the present embodiment, the eight information highways are identical and are used to transfer time-division multiplexed data to and from the QPLS. In the embodiment shown in FIG. 1, the eight information highway inputs (HYWI7-0) 74 are distinct from the eight information highway outputs (HYWO7-0) 72; however, in alternative implementations, the information highway inputs 74 and information highway outputs 72 can be tied together to form a bidirectional data path to and from the QPLS. The format of the time-division multiplexed data on the information highways is shown in FIGS. 7(a), 7(b), and 7(c). The serial data to and from the QPLS is transmitted in synchronization with clock signals. The information highway inputs 74 are synchronized with the highway input clock (HIC) 78, and the information highway outputs 72 are synchronized with the highway output (HOC) clock 82. Typically, the highway input clock 78 and the highway output clock 82 will be supplied from the same source and will be the same signal. In FIG. 7, the highway input clock 78 and the highway output clock 74 are shown as one signal. Alternatively, the information highway inputs 74 and the information highway outputs 72 can operate at different data rates to allow the data on the information highway inputs to be compressed or decompressed. For instance, if the highway output clock (HOC) 82 operates at twice the rate of the highway input clock (HIC) 78, the data from two information highway inputs 74 could be compressed by the QPLS and transmitted out on one information highway output 72 at twice the data rate. Decompression of data could be accomplished by operating the highway input clock 78 at a multiple of the highway output clock 82.

Data is continuously transferred to and from the QPLS on the information input highways 74 and information output highways 72; however, since the information is time-division multiplexed, further synchronization of data is required. The frame sync input (FSI) 76 occurs periodically to mark the beginning of a new frame of information on the information highway inputs 74. In the present embodiment, the frame sync input 76 occurs every 125 microseconds, and thus has a repetition rate of 8000 hertz. Similarly, the frame sync output (FSO) 80 occurs every 125 microseconds, and marks the beginning of a new frame of information on the information highway outputs 72. Typically, the frame sync input 76 and the frame sync output 80 are the same signal. In the presently preferred embodiment, the highway input clock 78 and the highway output clock 82 will operate at 2048 kHz, or 256 times the repetition rate of the frame sync input 76 and frame sync output 80. Thus, since the information on the highways is synchronized with the clock, there will be 256 pieces of information within each frame. Each of the pieces of information occupies a time slot in a message frame as shown in FIG. 7(a). Similarly, if the highway input clock 78 and highway output clock 82 operate at 4096 kHz or 8192 kHz, the number of information bits per frame will be 512 or 1024, as shown in FIGS. 7(b) and 7(c) respectively.

Figure 8:
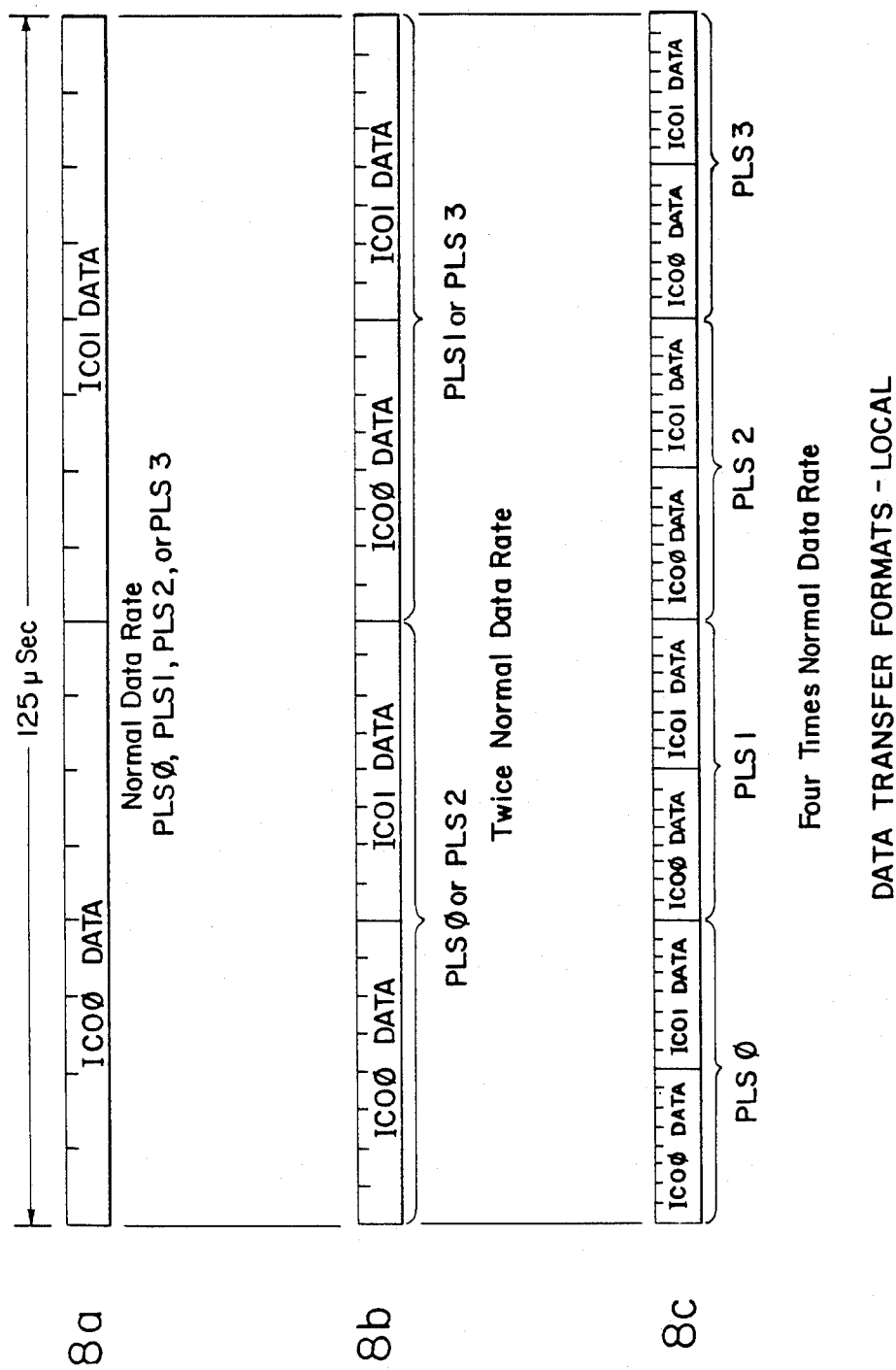
FIGS. 8(a)-(c) are timing diagrams exemplifying the data transfer formats to a station device in the local mode.
Figure 12:
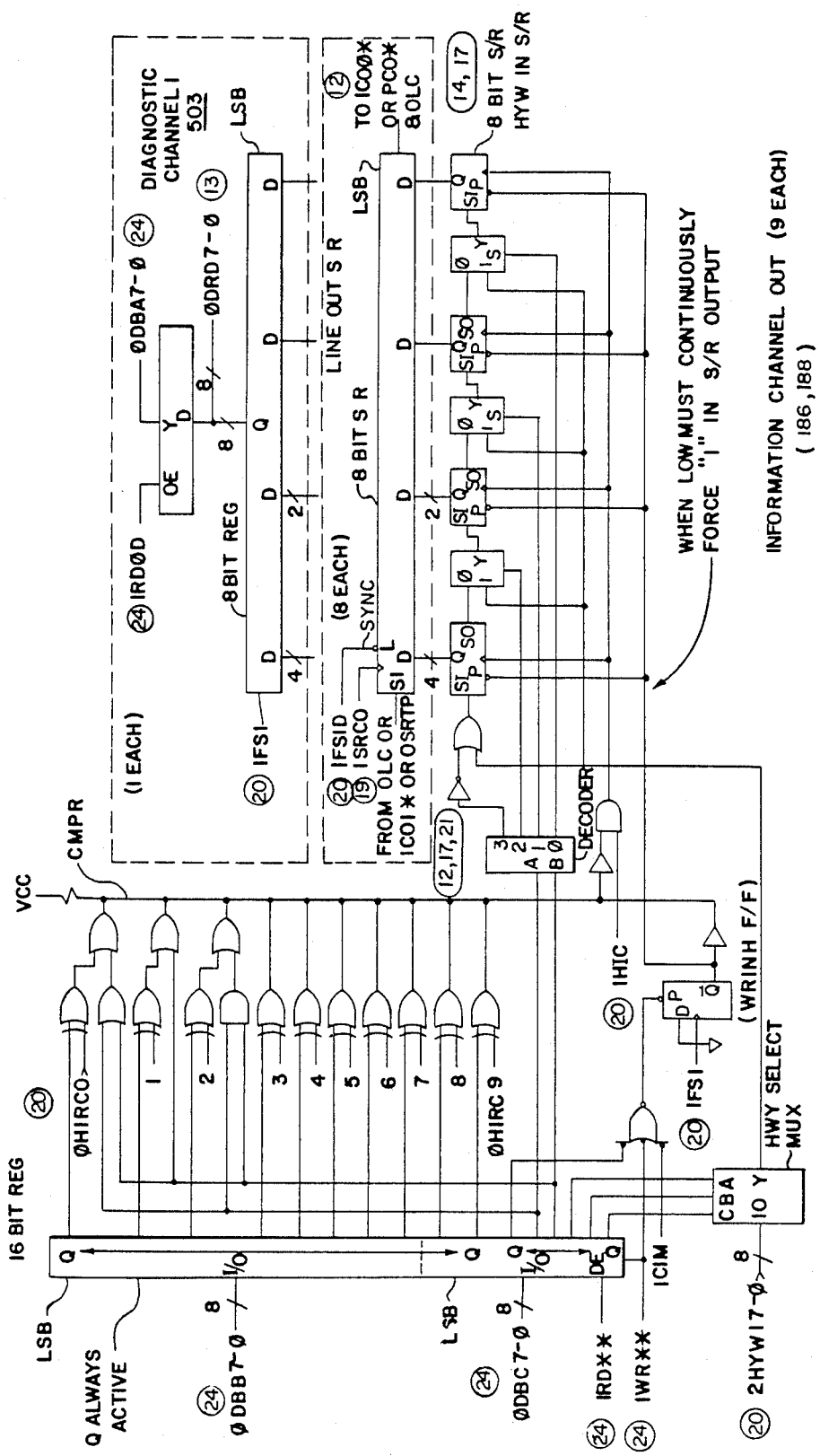
Figure 13:
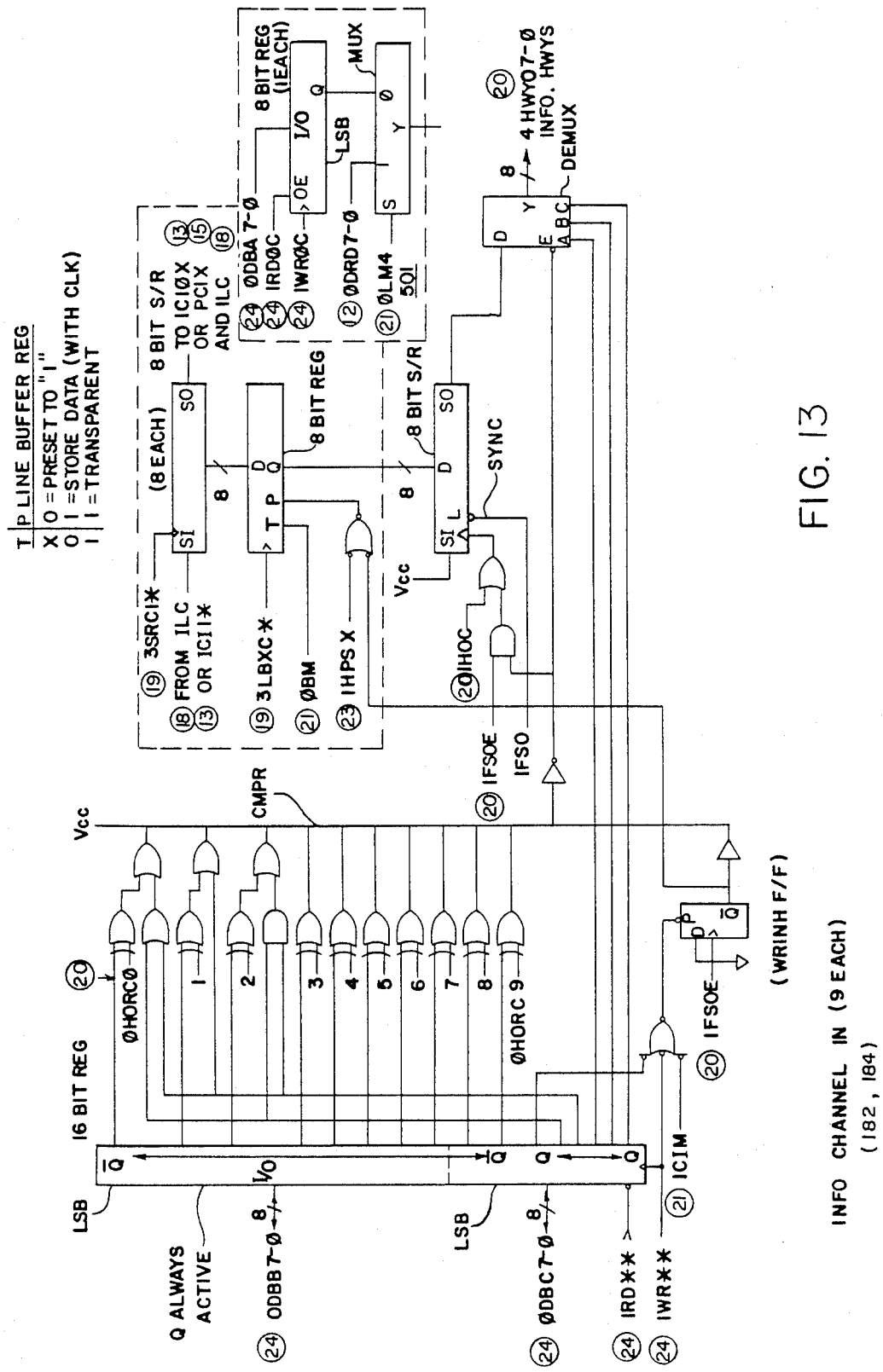
Figure 14:
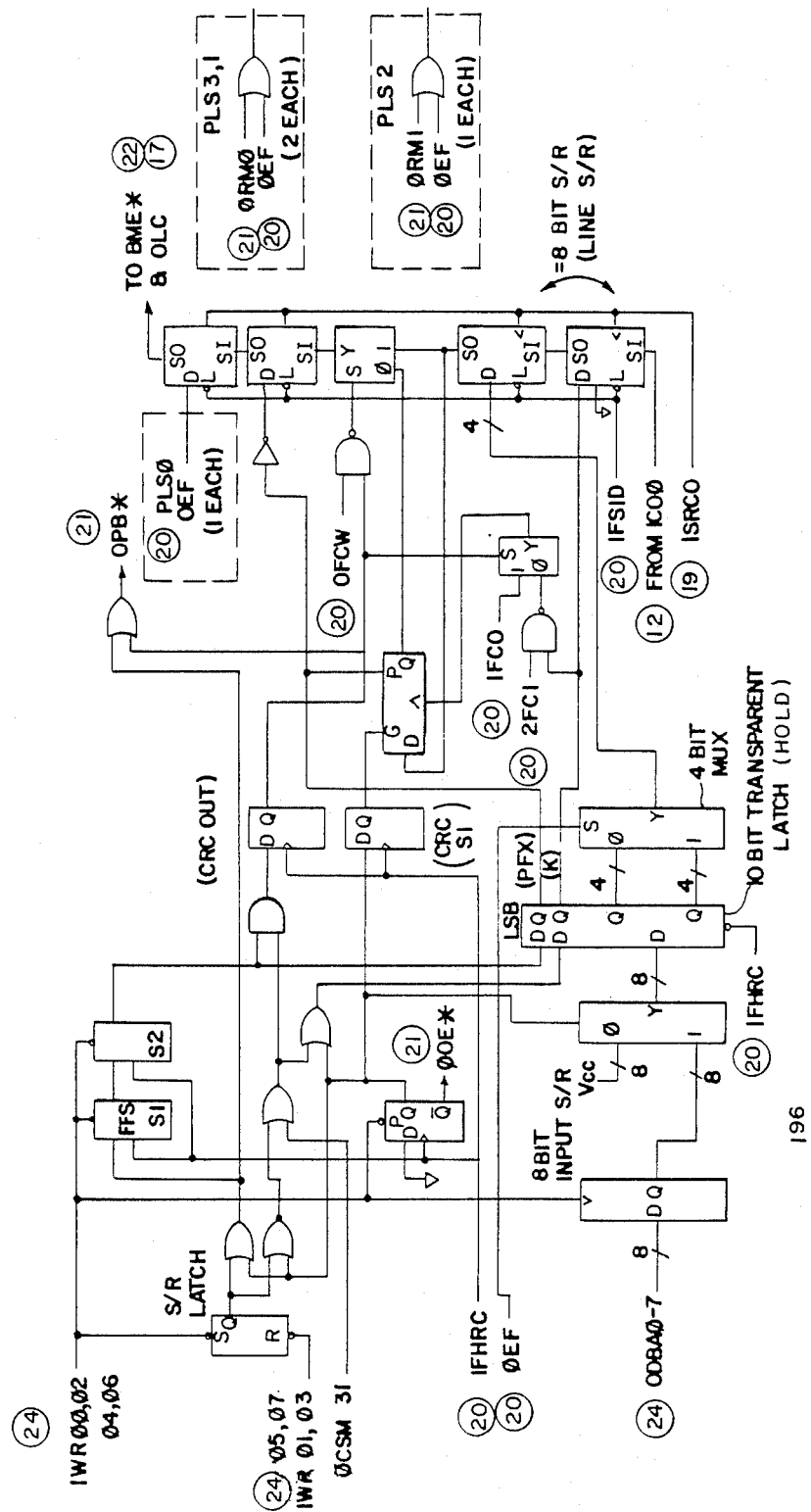
Figure 15:
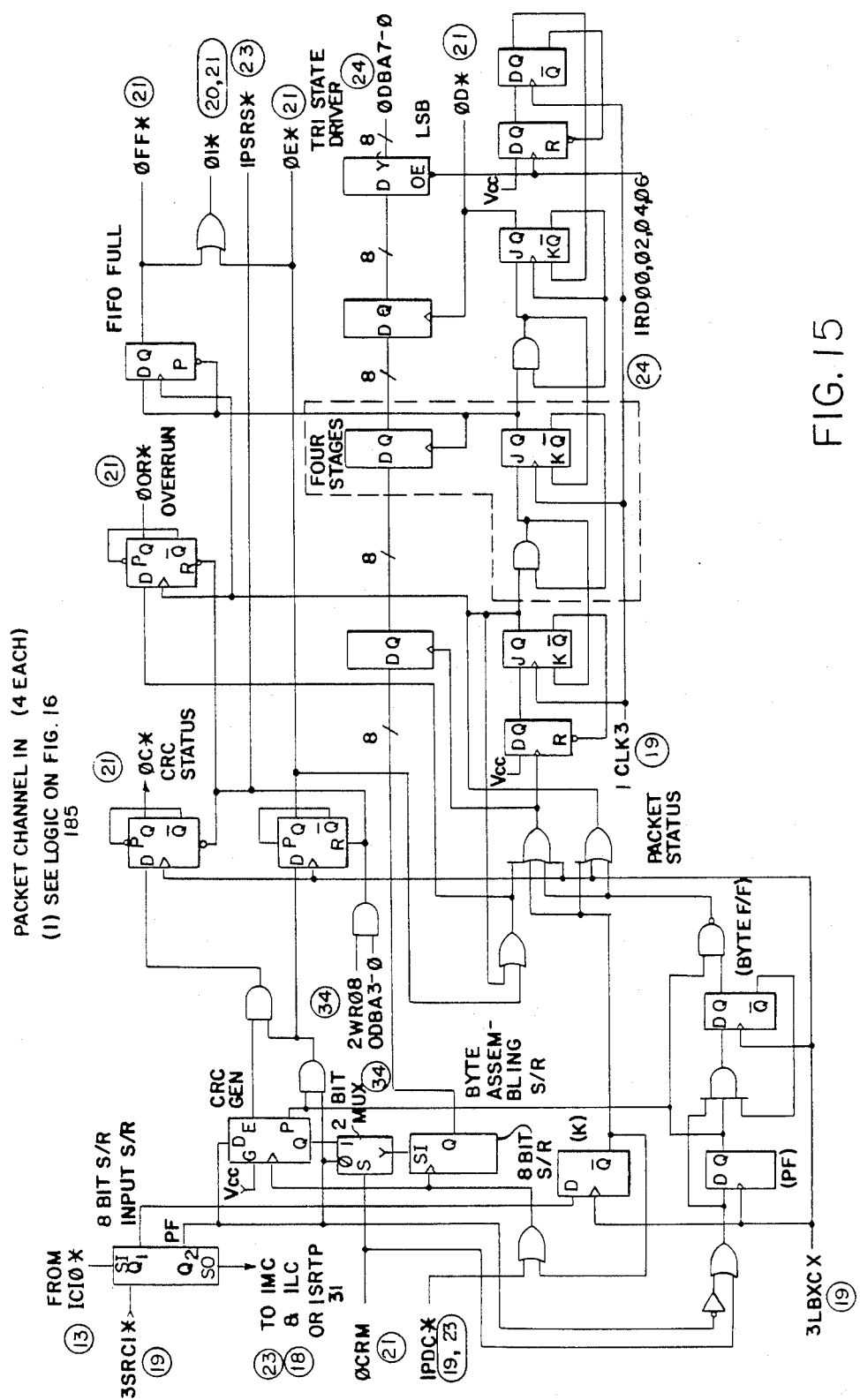
Figure 16:
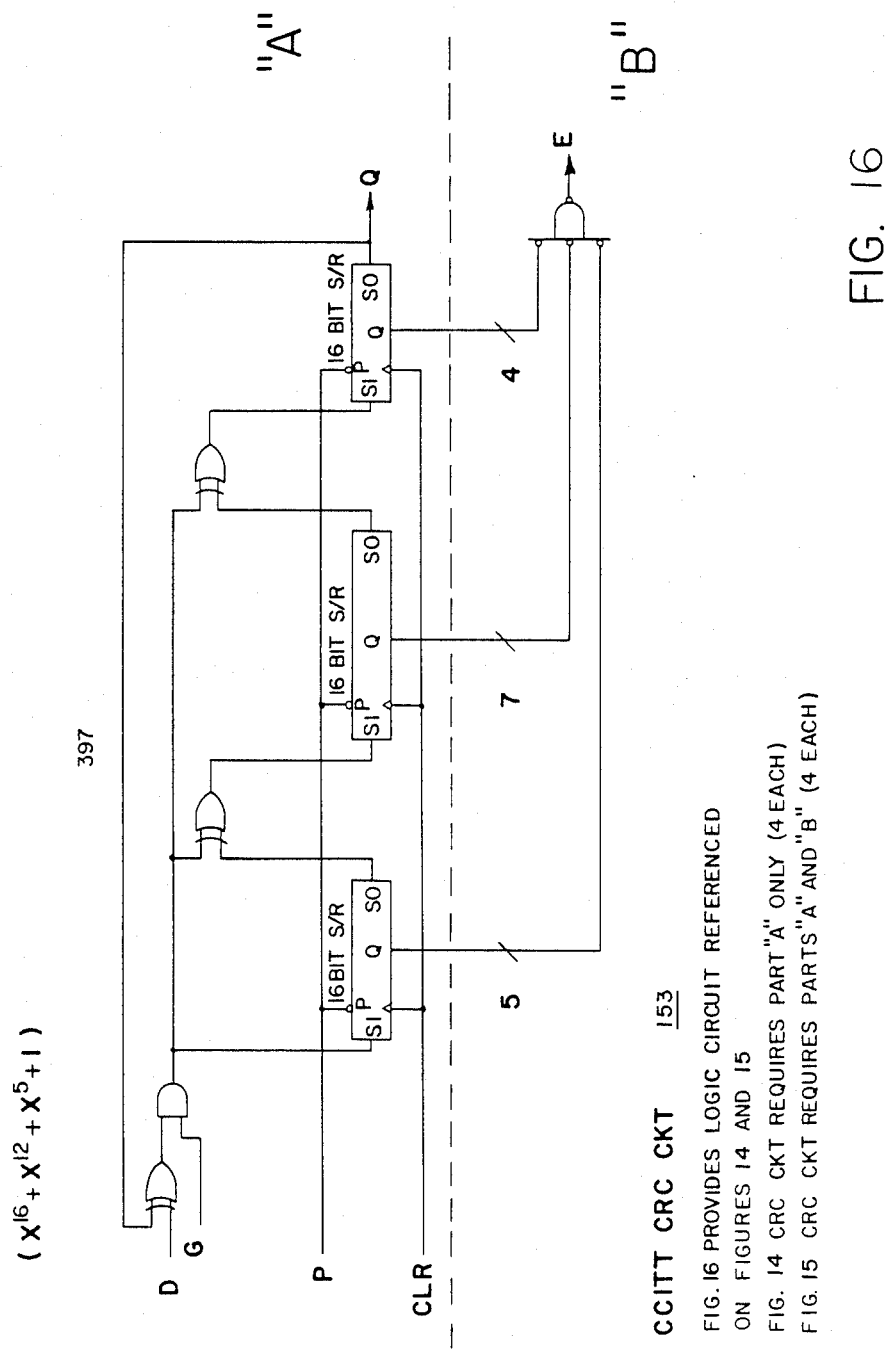
Figure 17:
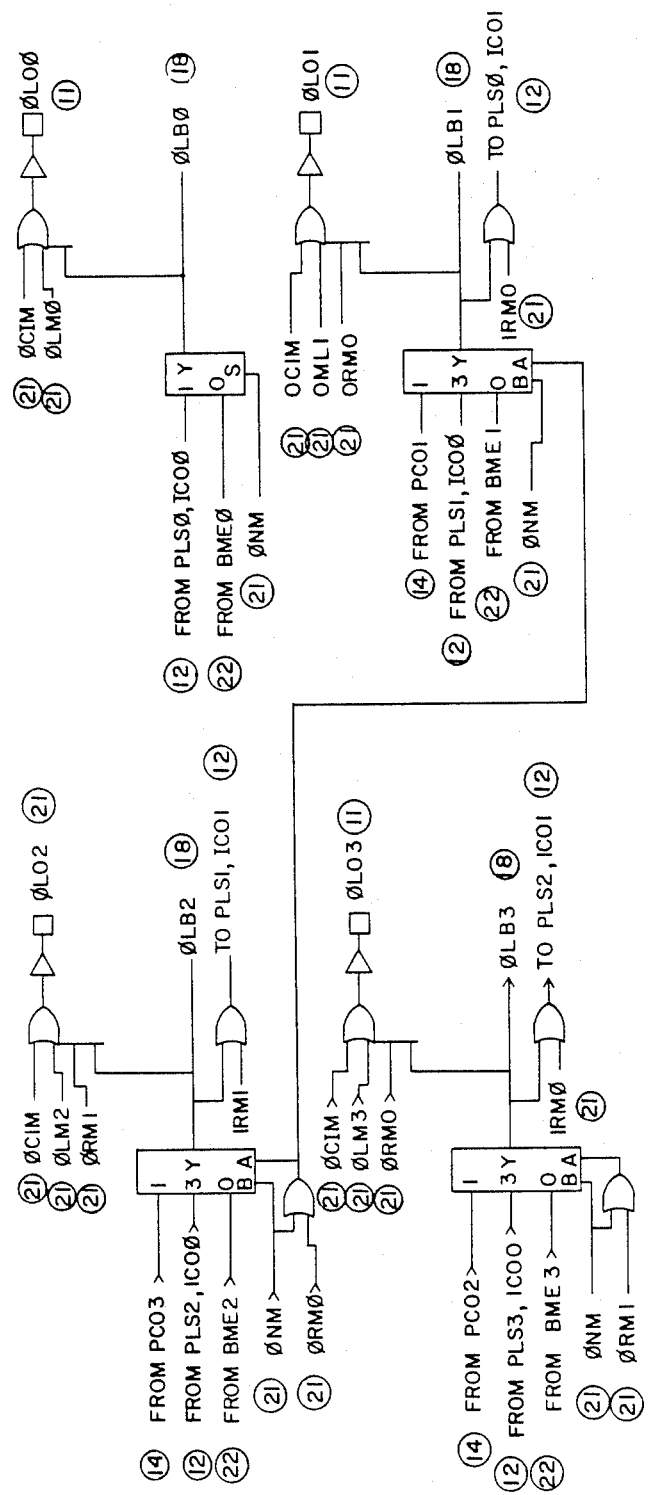
Figure 18:
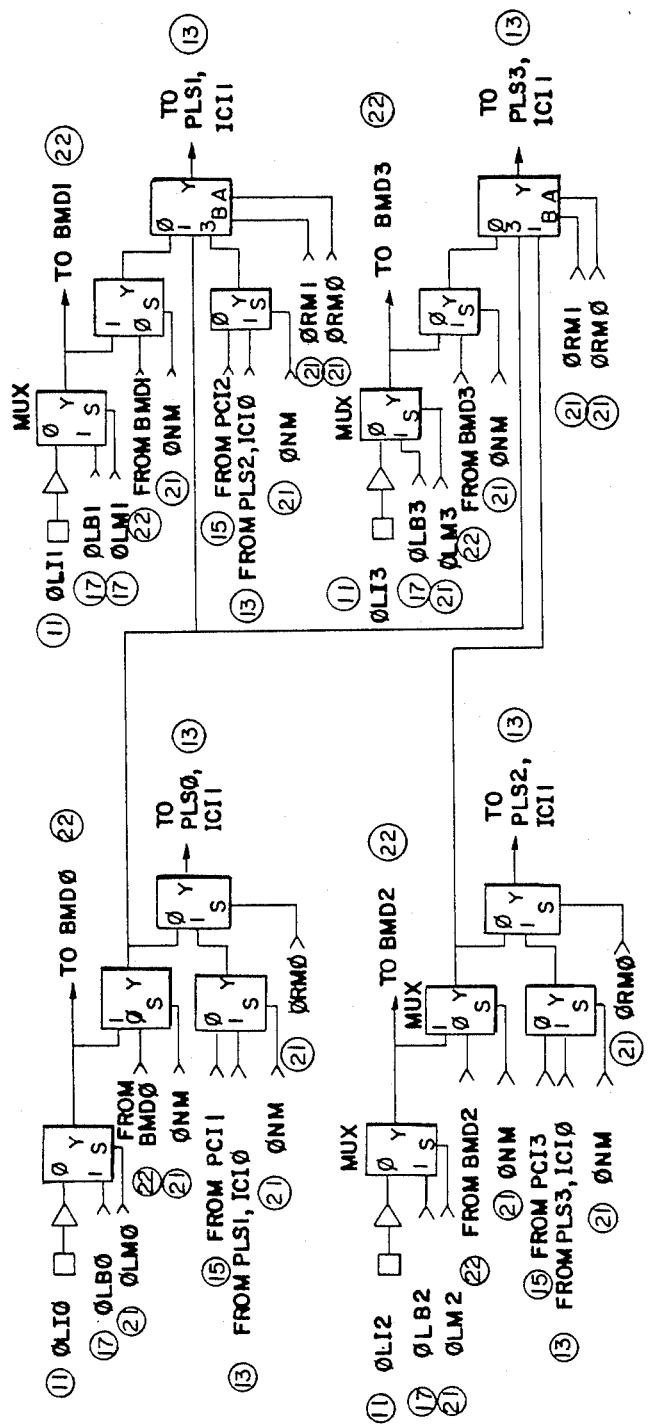
Figure 19:
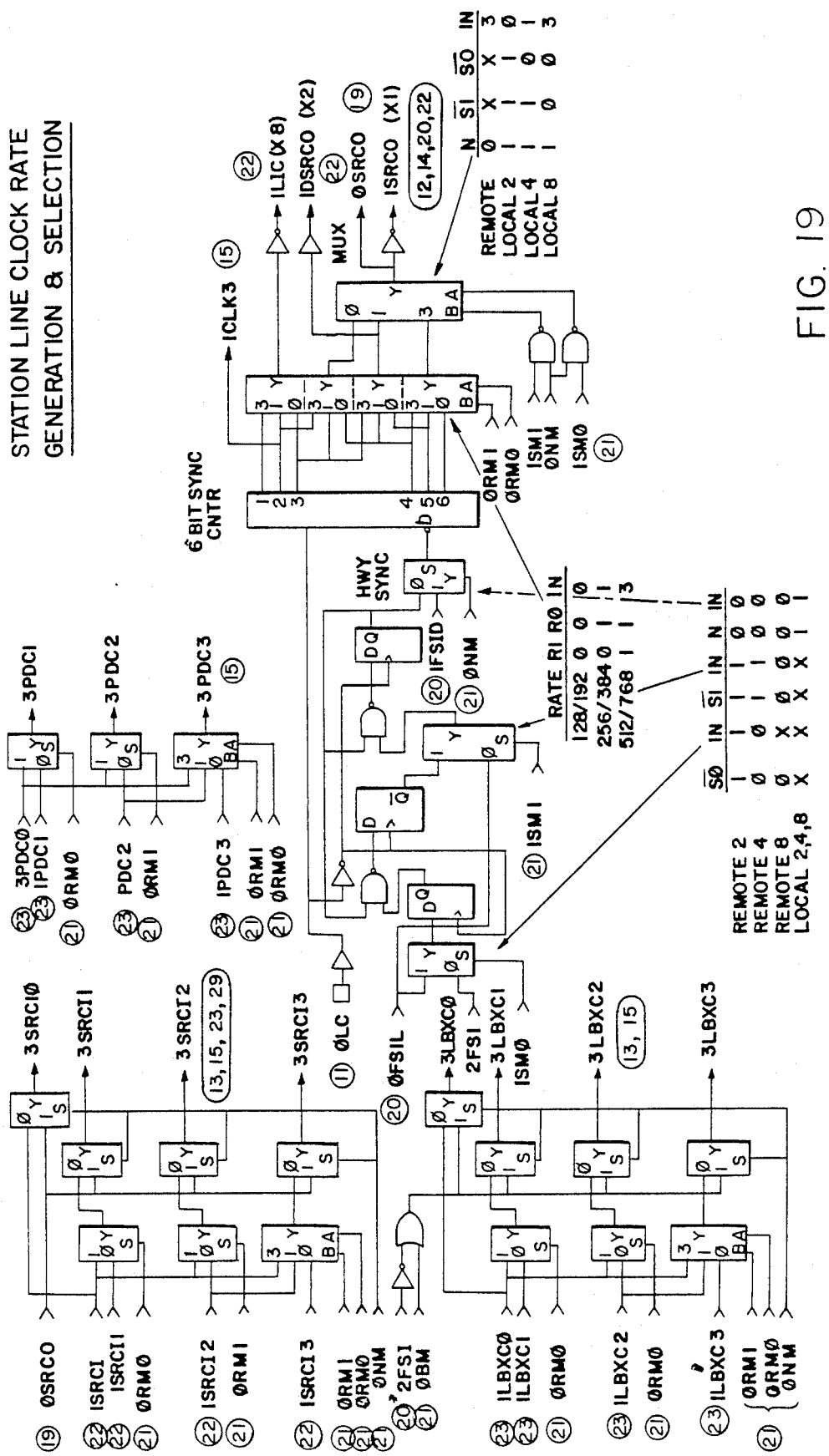
Figure 20:
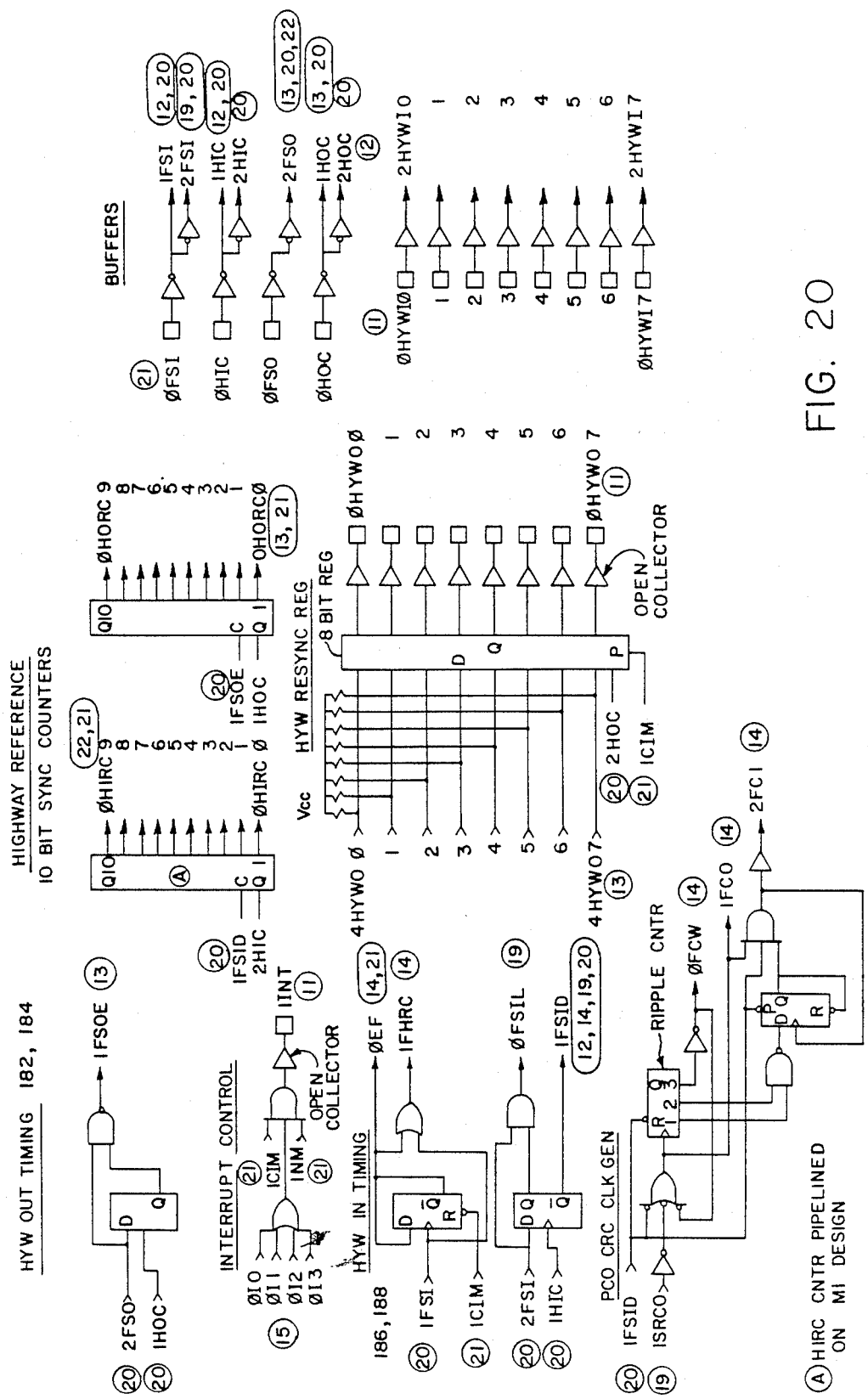
Figure 21:
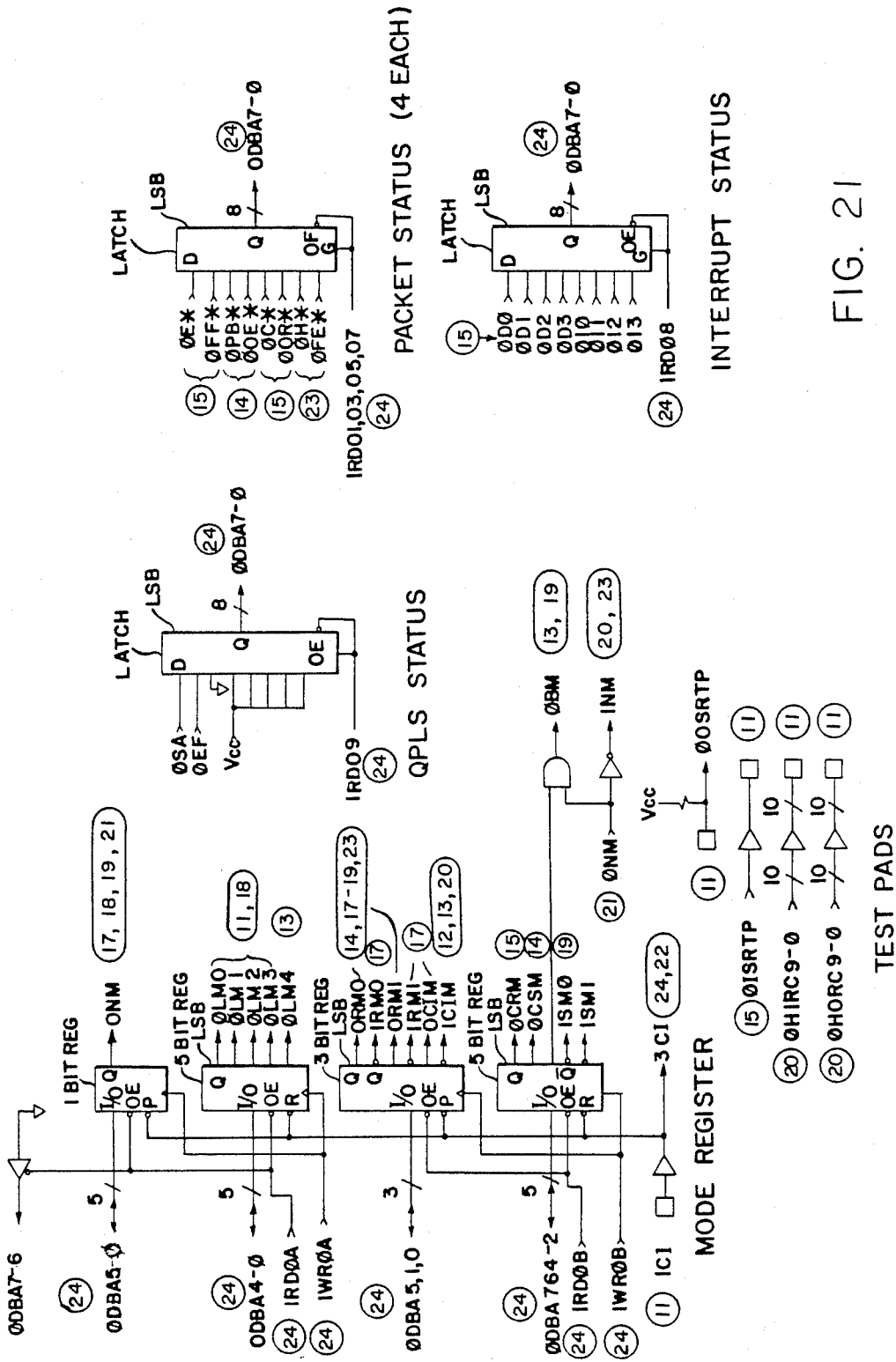
Figure 23:
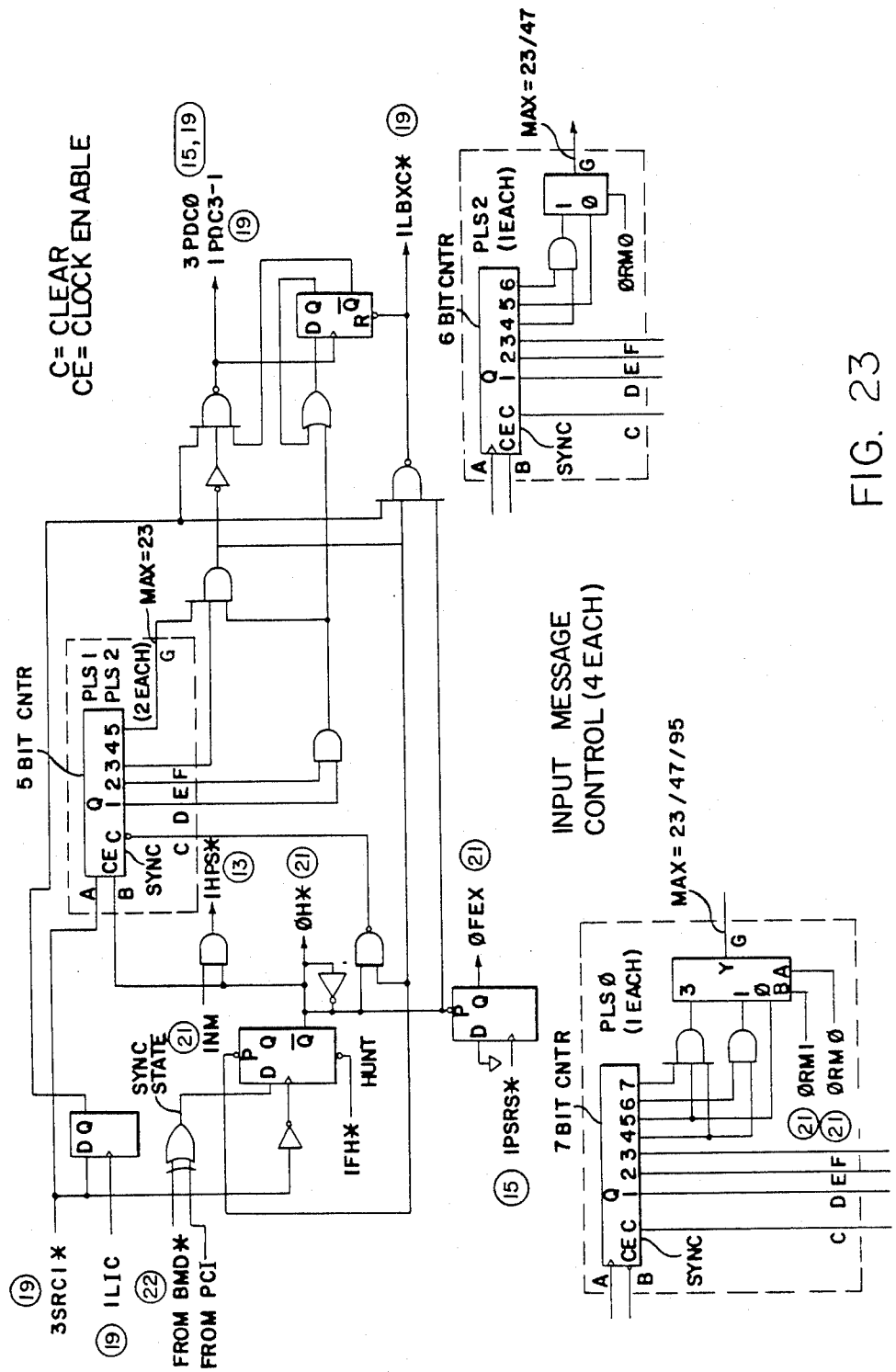
Figure 24:
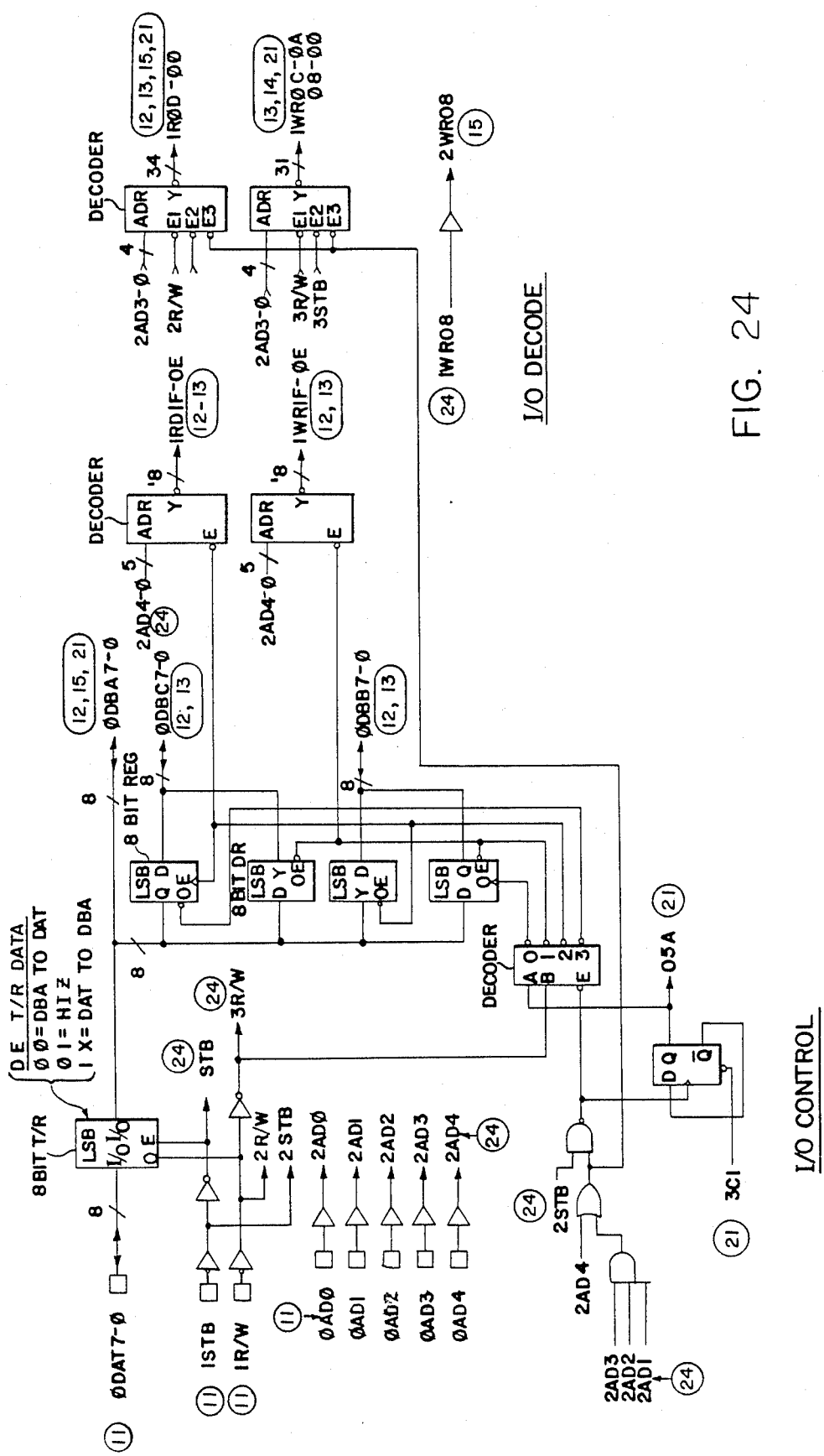
Figure 25:
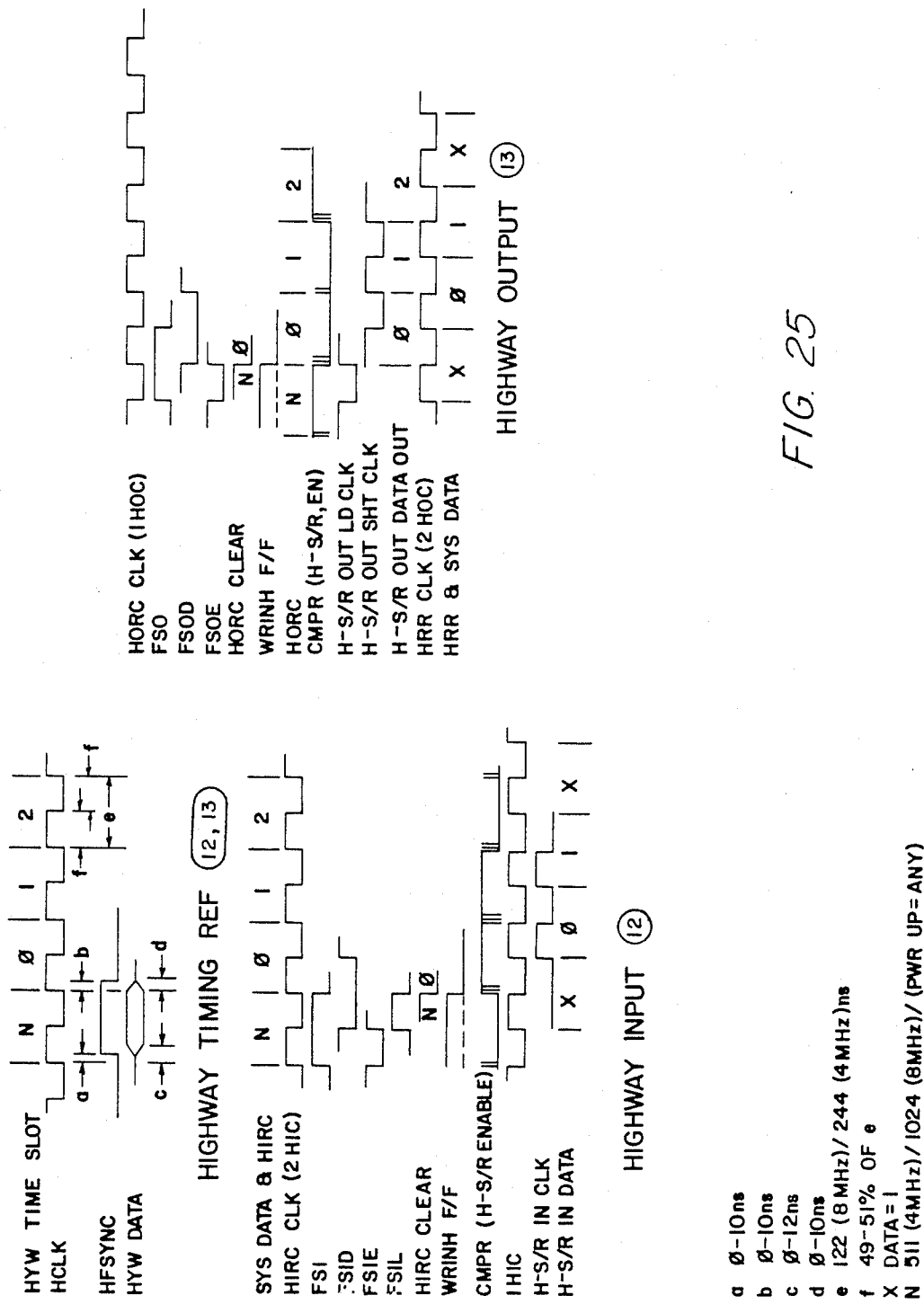
Figure 26:
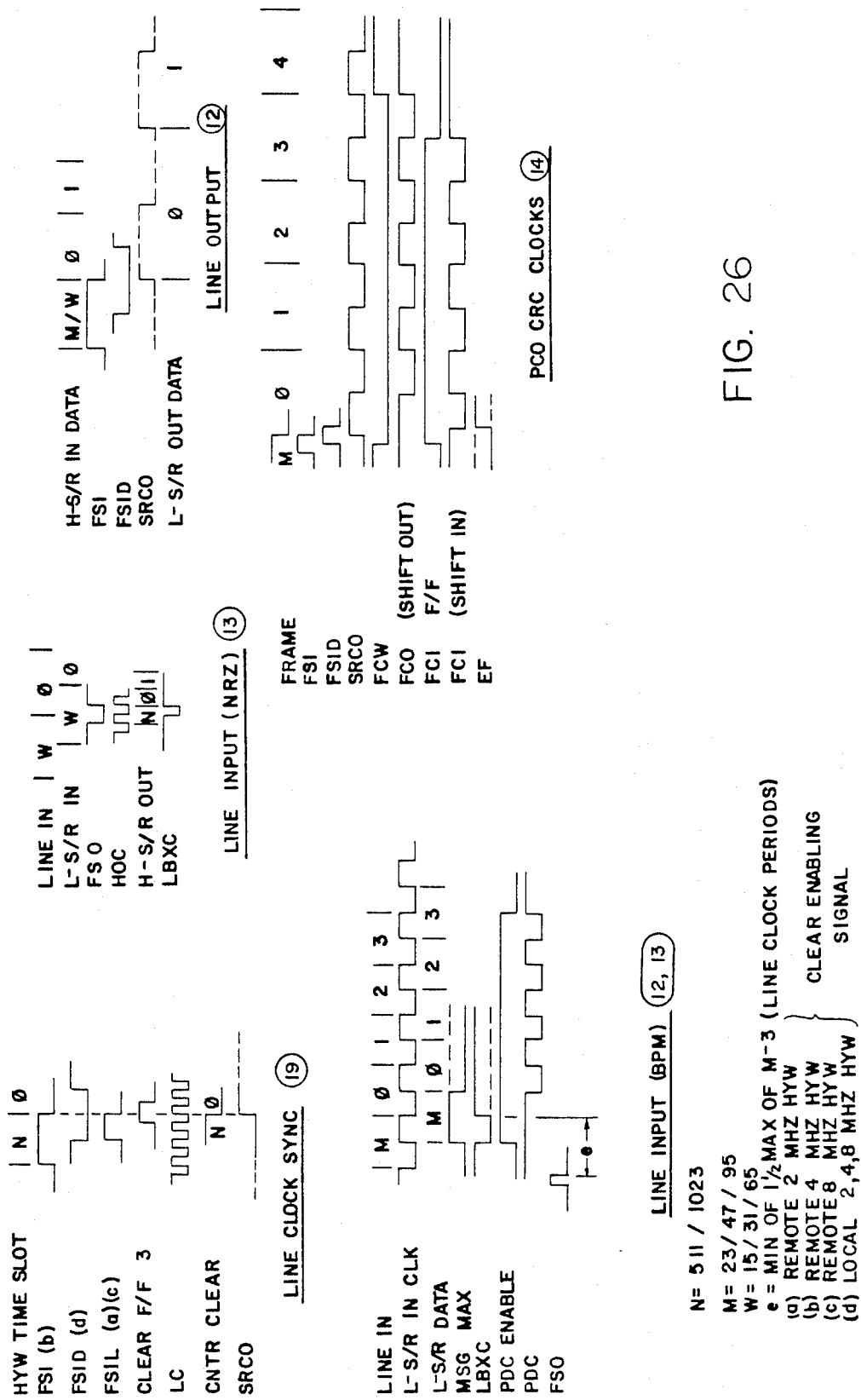
Figure 27:
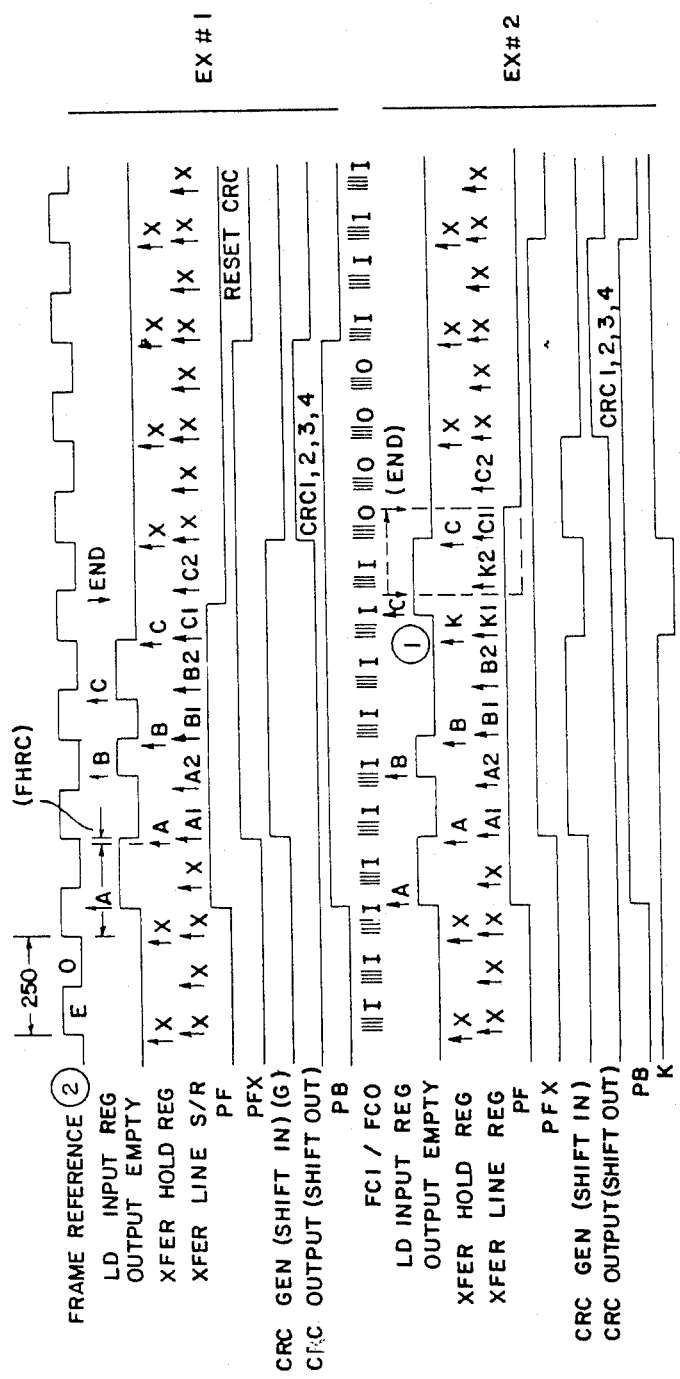
Figure 28:
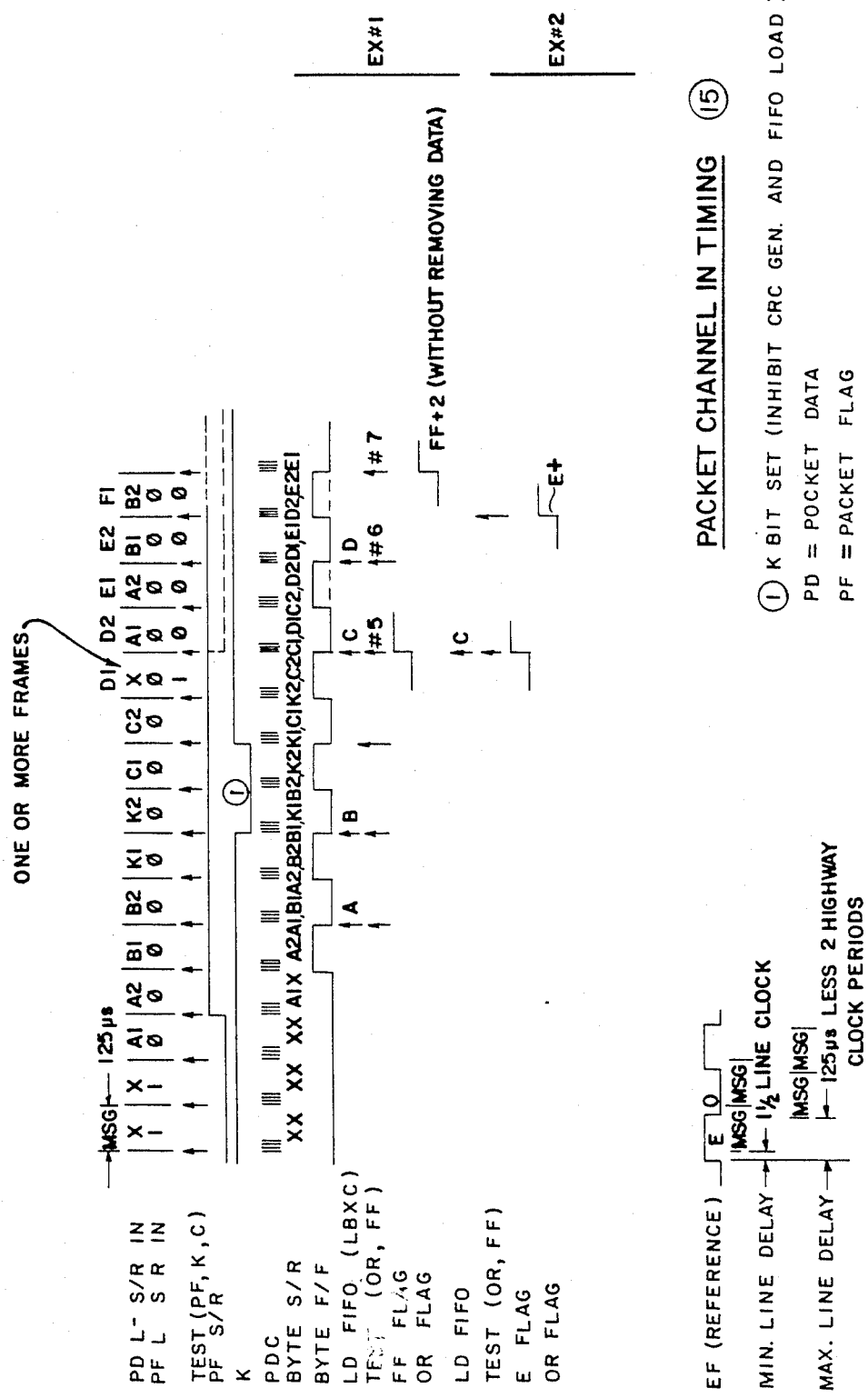
Figure 30:
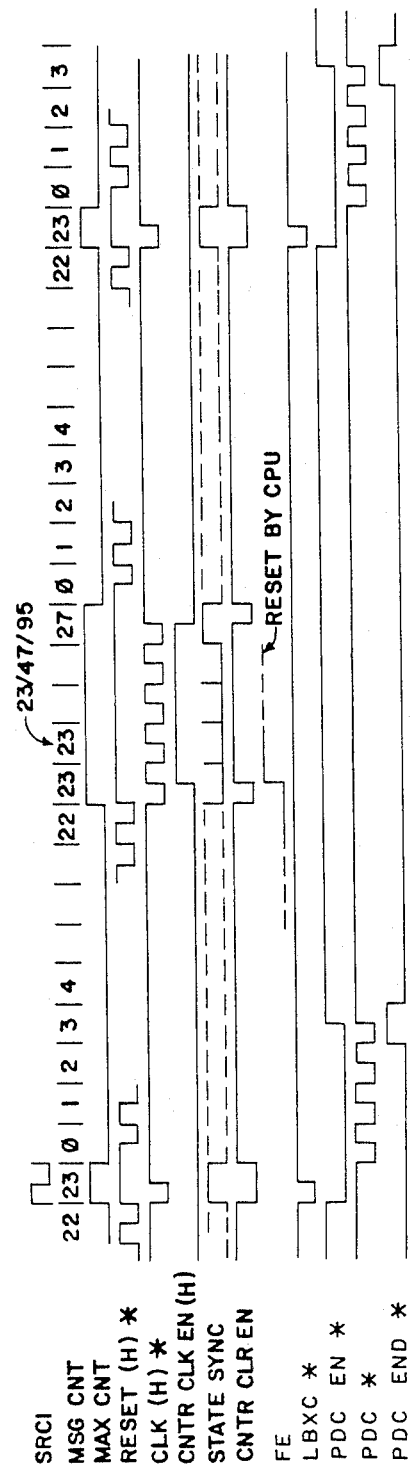

As previously described, the QPLS transfers data between the high-speed information highways 72, 74 and the station devices 90, which operate at a slower data rate. Typically, a station device can receive data at a rate of 128,000 bits per second. This is illustrated in FIG. 8(a). Thus, since a single information highway input typically transfers data at a rate 16 times higher than the station device (i.e., 2,048,000 frames per second, each frame including 256 information bits), only selected portions of an information highway frame can be transferred to the station device. Returning to FIG. 7(a), each of the 256 pieces of information in a frame is called a data bit. The QPLS transfers selected portions of the data on the information highways from the information highways to station devices, and transfers data from the station devices to selected time slots in the message frames of the information highways. Up to 64 bits of information can be transferred from the information highways to station devices and from the station devices to the information highways during each 125-microsecond frame. As described below, the data is transferred in groups comprising one to eight bits of data. The number of bits of data in a group is the bandwidth of the group. The location of the first bit of a group transferred with reference to the beginning bit of the information frame is designated as the channel of the information. Thus, depending upon the selected bandwidth, the information highways can have up to 256 channels of information per frame with a clock rate of 2048 kHz. The ability of the QPLS to dynamically select the channels and the bandwidths of the data to be transferred, as will be described more fully herein, is one of the advantages of the QPLS over the prior art.

Although the QPLS can transfer up to 128,000 bits per second to a station device in the normal mode, certain applications require the transfer of data at a higher rate. As will be described more fully herein, the QPLS has the ability to dynamically increase the rate at which data can be transferred between the information highways and a station device. In the normal data rate configuration, the QPLS can transfer up to 128,000 bits per second to each of four station devices. In the medium data rate configuration, the QPLS can transfer up to 256,000 bits per second to two devices. In the high data rate configuration, the QPLS can transfer up to 512,000 bits per second to a single station device. The formats of the data transferred in the medium data rate configuration and the high data rate configuration are illustrated in FIGS. 8(b) and 8(c).

In the normal, medium and high data rate configurations described in the immediately preceding paragraph, the data transfers may occur synchronously or asynchronously with the data on the information highways. In the "local" mode, data transferred to and from the station devices connected to the QPLS is synchronized with the information highway clocks 78, 82 and the frame syncs 76, 80, by direct connection to those signals. The station devices can also be controlled by the same means as the QPLS. If the stations devices are not on the same circuit board as the QPLS, it is not always practical to have the station devices controlled by the same clocks and synchronization signals. The QPLS can be configured in the "remote" mode to synchronously transfer data to and from such remotely connected devices without sending the highway clocks and synchronization signals to the devices. In the remote mode the transmission of data to and from remote devices by the QPLS is accomplished with self-synchronizing data transfers. The data transferred to the remote devices is synchronized with the information highway timing. The data from the remote devices to the QPLS is self-synchronized within the QPLS. This is done by transmitting the data as biphase mark encoded data in a format shown in FIG. 10. As compared with nonreturn-to-zero (NRZ) data, the biphase mark encoded data has at least one transition between the high and low state for each data bit. A decoding circuit at the receiving end can derive a clock and a data signal from the encoder signal. Of course, other self-synchronizing data formats can be used.

Because the device connected to the QPLS in the remote mode is not synchronized with the frame sync signals 76, 80, the QPLS transmits a synchronization signal to and receives a synchronization signal from the station device to mark the beginning of a frame of data between the QPLS and the station device. Furthermore, since the external means which controls the QPLS is not on the same circuit board as the station devices, the QPLS provides a means of transferring control and status information between the external control means and the station devices. The synchronization signals and the control and status signals are transferred between the QPLS and the station devices as the first eight bits of data preceding the sixteen bits of information data. This is illustrated in FIG. 9(a). As can be seen in FIG. 9(a), in order to accommodate the additional eight bits of data, in the low data rate configuration, the data is transferred between the QPLS and the station device at 192 kHz, in contrast to the 128 kHz data rate in the local mode. Similarly, as shown in FIGS. 9(b) and 9(c) for the medium and high data rate configurations, in the remote mode the data is transferred between the QPLS and the station devices at 1.5 times the corresponding data rates in the local mode.

The QPLS can also be reconfigured to selectively bypass any of the station devices. In this "loopback" mode, the information from the QPLS which would normally be transferred to a station device is instead received directly by the QPLS in the same manner in which data would normally be received from a station device; however, the loopback connection is internal to the QPLS. Thus, data is transferred from selected information highway inputs 74 to selected information highway outputs 72. This can be advantageously used for diagnostic purposes or for switching between information highways.

More detailed descriptions of the local/remote mode, the low data rate/medium data rate/high data rate mode, and the normal/loopback mode will be disclosed below in connection with the detailed drawings.

Referencing FIG. 1, the QPLS 21 transmits data to the four station devices 90 on the line outputs (LO3--LO0) 84 and receives data from the four station devices 90 on the line inputs (LI3-LI0) 86. In the local mode, the data on the line outputs and line inputs is synchronized with the data on the information highway inputs (HYWI7-0) 74, and with the information highway outputs (HYWO7-0) 72 by the line clock (LC) 88. The line clock (LC) 88 operates at the data rate of the information highways (2,048; 4,096; or 8,192 kilohertz). In the remote mode the line clock operates at higher rates, e.g., 12,288 kilohertz, and facilitates encoding and decoding of data communicated between the station devices and the information highways over transmission lines. Upon receipt of data from the information highways in the remote mode, the line clock is used to generate biphase mark encoded data transmitted to the station devices on the line outputs. Upon receipt of data from a station device in the remote mode, the line clock is used to decode the biphase mark encoded data received from the station devices on the line inputs by sampling the input signal at sixteen times the maximum input data rate. (The biphase mark encoded data is sometimes referred to as biphase Manchester encoded data.)

EXTERNAL CONTROL

The QPLS 21 is controlled by a microprocessor 23 or another external control means. Principal control signals are communicated to the QPLS via the address lines (AD4-AD0) 402, the data lines (DAT7-DAT0) 404, the read/write control line (R/W) 406, and the strobe (STB) 408. The QPLS signals the microprocessor upon the occurrence of internal events by activating the interrupt line (INT) 410. The QPLS is initialized by the microprocessor or by external power-on reset logic by activation of the chip initialize line (CI) 412. The five address lines (AD4-AD0) 402 are controllable by the microprocessor and determine the interface operation to be performed. The read/write control line (R/W) 406 determines whether data or control information is transmitted from the microprocessor to the QPLS in the write mode, or whether data or status information is transmitted to the microprocessor from the QPLS in the read mode. Such data, control or status information is transmitted over the eight bidirectional data lines (DAT7-DAT0) 404. The strobe (STB) 408 clocks data into the QPLS in the write mode and indicates completion of the data transfer in the read mode. The chip initialize line (CI) 412 functions to cause the QPLS to be initialized to certain known conditions when it is activated by the microprocessor or power on reset logic. In particular, the QPLS is disabled from communicating with the information highways or the station devices until specifically activated by the microprocessor.

GENERAL DESCRIPTION OF DATA FLOW FROM HIGHWAYS TO STATION DEVICES

Figure 2:
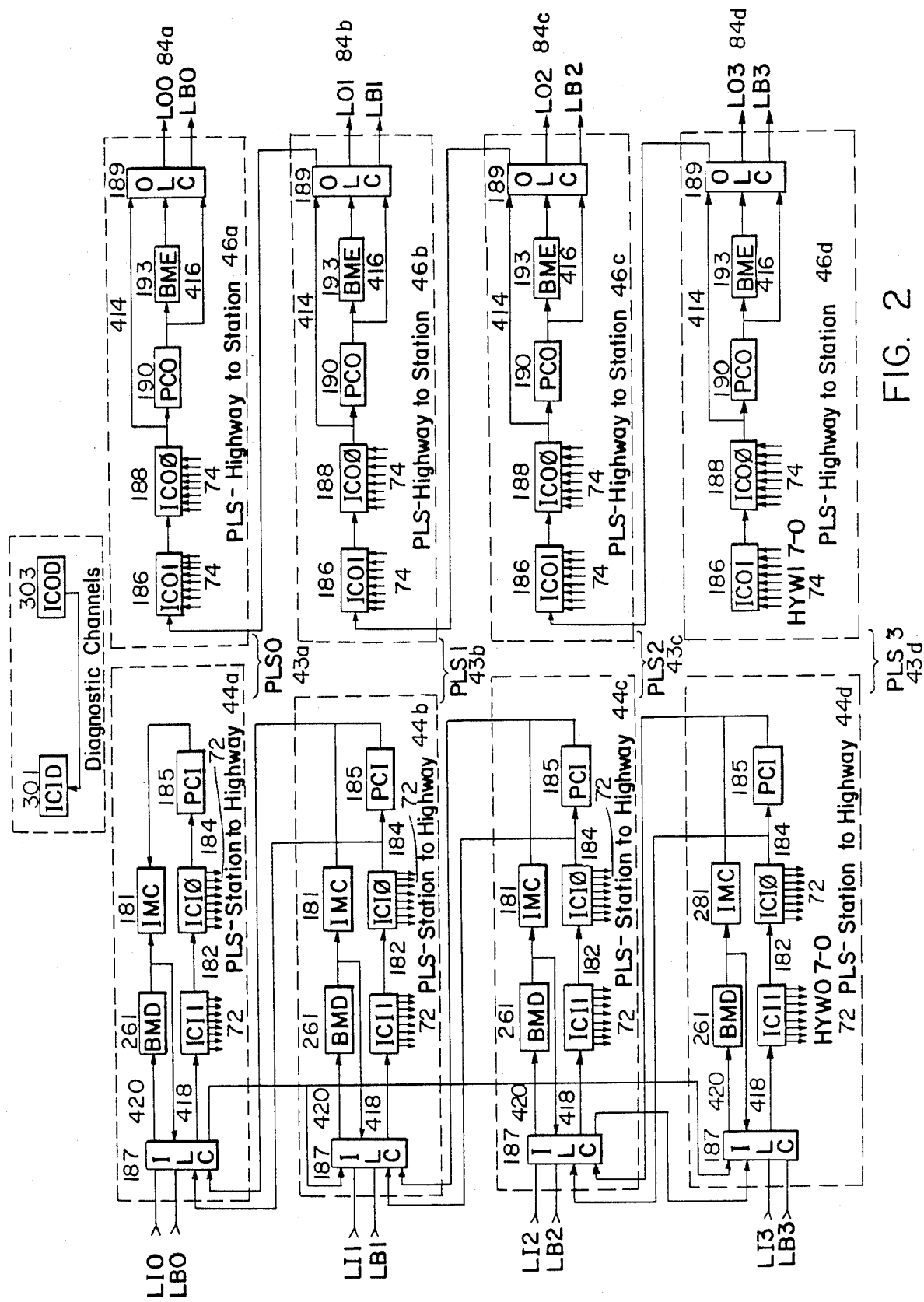
FIG. 2 is a block diagram of the connections between several of the principal portions of the Quad Per Line Switch.

As shown in FIG. 2, the QPLS 21 is composed of four essentially identical per line switches (PLS's) 43 a, b, c and d. Functionally, each PLS 43 consists of a station-to-highway circuit 44 and a highway-to-station circuit 46 which operate independently or in conjunction with the corresponding circuits in the other PLS's. The highway-to-station circuit receives serial information data from the information highway inputs 74 and transfers the data in the selected format to the station device 90(a-d), (see FIG. 1) connected to the respective PLS. The highway-to-station circuit 46 includes information channel output circuits (ICO1 186 and ICO0 188), the packet channel output circuit (PCO 190), the biphase mark encoder circuit (BME 193), and the output logic control circuit (OLC 189). As shown in more detail in FIG. 3(a), each information channel output circuit ICO1 186 and ICO0 188, selects an information highway input 74, a starting bit for a channel on the highway and a channel bandwidth independently of the other. In the local mode of the preferred embodiment, both ICO1 186 and ICO0 188 receive up to eight bits of data from the information highway inputs 74 in one 125-microsecond frame. The data is transmitted to the station device 90 during the following 125-microsecond frame in the format shown in FIG. 8(a). In the local mode, in the preferred embodiment, the PCO 190 and BME 193 are bypassed by line 414. In the remote mode, in the preferred embodiment, the PCO 190 transmits eight bits of data consisting of synchronization bits and control information from the microprocessor to the station device preceding the data signal, e.g. sixteen bits, from the information channel output circuits. The total 24 bits of serial information are transformed to biphase mark encoded data by BME 193 and are transmitted at 1.5 times the local data rate in the 125-microsecond frame in the format described in more detail in connection with FIG. 9(a).

GENERAL DESCRIPTION OF DATA FLOW FROM STATION DEVICES TO HIGHWAYS

The station-to-highway circuit, e.g. 44d in PLS 43d, consists of the input logic control (ILC 187), the biphase mark decoder (BMD 216) the information channel input circuits (ICI1 182 and ICI0 184), the packet channel input logic circuit (PCI 185) and the input message control logic circuit (IMC 181). The station-to-highway circuit 44 in PLS 43d receives serial data on LI3 86d from the device 90d connected to the station port and transfers that data to selected channels on selected information highway outputs 72. Each of the information channel input circuits, ICI1 182 and ICI0 184, independently selects an information highway output 72, a starting bit for a channel on the highway and a channel bandwidth. In the local mode, only 16 bits of data are input to the PLS 43d and the packet channel input logic circuit 185 in the station-to-highway circuit 44d is not used. The data from the station device 90d is typically in nonreturn-to-zero (NRZ) data format, and the biphase mark decoder logic 261 is not used. This is accomplished under the control of ILC 187 which channels data directly to ICI1 182 via line 418, rather than to BMD 261 via line 420. The IMC 181 allows the data to be clocked in synchronization with the information highway outputs 74. In the remote mode, the biphase mark decoder (BMD) 261 in the station-to-highway circuit 44d receives encoded data from ILC 187 and derives NRZ data and a clock from the encoded data. The first eight bits of the 24 bits of data are used by the packet channel input circuit (PCI) 185 to derive data and status information from the station device for transmission to the microprocessor. The data is accessed by the microprocessor 23 via data lines (DAT0–7) shown on FIG. 1. The PCI 185 and IMC 181 function to verify that the received data is synchronized.

INTERCONNECTION OF THE PLS'S FOR HIGHER DATA RATES

As shown in FIG. 2, the PLS's are interconnected to allow data transfers to occur at higher data rates. In the low data rate configuration, each PLS 43 operates independently and transmits up to 16 bits of data to and receives up to 16 bits of data from its corresponding station device 90 in the local mode, or 24 bits in each direction in the remote mode.

HIGHER SPEED DATA RATE CONFIGURATIONS (a) Highway-to-Station Interconnections In the medium data rate configuration, the interconnections on the highway-to-station circuits 46 of two PLS's, such as PLS0 and PLS1, allow the two PLS's to operate as a single unit. The output of ICO0 188 or PCO 190 of PLS1 is input to ICO1 186 of PLS0 via OLC 189. Thus, in the local mode, the output of PLS0 to the station device is 16 bits of data from PLS0 followed by 16 bits of data from PLS1, and will be transmitted on line LO0 84a to the station device 90a connected to OLC 189 of PLS0. The resulting 32-bit data signal is transmitted to the station device 90a in 125 microseconds at twice the low data rate in the format shown in FIG. 8(b). In the remote mode, the data signals from the highways and the accompanying control and signaling information to the station device, e.g. 48 bits of signal total, is transmitted to the station device 90a in one frame, e.g. 125 microseconds. No data is transmitted to an external device on PLS1, and BME 193 of PLS1 is bypassed via line 416 since the data will be encoded by BME 193 in PLS0. The operation of PLS2 and PLS3 in the medium data rate configuration is substantially identical to that set forth in connection with PLS0 and PLS1. The data received from the information highway inputs 74 selected by ICO1 186 and ICO0 188 in PLS2 and PLS3 in transmitted to the station device 90c connected to OLC 189 of PLS2.

In the high data rate configuration, the highway-to-station circuits 46 in the four PLS's are interconnected so as to cooperatively transmit data to the station device 90a connected to PLS0. All four PLS's are interconnected in a fashion similar to the PLS interconnections in the medium data rate configuration, with the data output of PLS2 (ICO0 188 or PCO 190) transferred to ICO1 186 of PLS1. In the local mode, data signals from the highways connected to ICO0 and ICO1 of each PLS, e.g. up to 64 bits, are transmitted to the station device connected to PLS0 during each 125-microsecond frame at four-times the normal data rate, in the format shown in FIG. 8(c). In the remote mode, data and control signals from ICO0 188, ICO1 186, and PCO 190 of each PLS, e.g. 96 bits are transmitted to the device in the format shown in FIG. 9(c).

(b) Station-to-Highway Interconnections

The station-to-highway circuits 44 in each PLS 43 may be similarly interconnected to operate at different data rates. In the medium data rate configuration of the station-to-highway circuits 44, data is received from the station devices 90a, 90c connected to PLS0 and PLS2. The data from the station device 90a connected to PLS0 is input through ILC 187 of PLS0. In the remote mode, the data signals and the accompanying control and signaling information, e.g. 48 bits, from the station device 90a are clocked through ILC 187 of PLS0, and NRZ data and clock are derived from the encoded signal by BMD 261 of PLS0. The data is then clocked through ILC 187, ICI1 182, ICI0 184, and PCI 185 of PLS1, then back through ILC 187, ICI1 182, ICI0 184, and PCI 185 of PLS0. In the remote mode, clocking and synchronization of the data is controlled by IMC 181 of PLS0. BMD 261 of PLS1 is not used on this configuration since the clock and data have been derived by BMD 261 of PLS0. In the local mode, the data signals, e.g. 32 bits, from the station device, are input through ILC 187 of PLS0, then through ILC 187, ICI1 182, and ICI0 184 of PLS1, then back through ILC 187, ICI1 182 and ICI0 184 of PLS0. The interconnections between PLS2 and PLS3 are similar to the interconnections of PLS0 and PLS1 in the medium data rate configuration, and the data is input from the station device 90c connected to ILC 187 of PLS2.

In the high data rate configuration of the station-to-highway circuits 44, data is received from the station device 90a connected to ILC 187 of PLS0. In the remote mode, the signal data and control and signaling information, e.g. 96 bits, from the station device 90a is clocked through ILC 187 of PLS0 where NRZ data and clock are derived by BMD 261 of PLS0. The data is then clocked through ILC 187, ICI1 182, ICI0 184, and PCI 185 of PLS3, PLS2, PLS1 and PLS0, in that order. Synchronization and clocking are controlled by IMC 181 of PLS0. In the local mode, the signal data, e.g. 64 bits, from the station device 90a connected to ILC 187 of PLS0, is clocked through ILC 187 of PLS0, then through ILC 187, ICI1 182, and ICI0 184 of PLS3, PLS2, PLS1 and PLS0, in that order.

GENERAL DESCRIPTION OF THE LOOPBACK MODE

Another feature of the QPLS is the ability to configure the PLS's in the loopback mode. In the loopback mode, each PLS can independently select the output of OLC 189 as the input to ILC 187. The loopback mode has the effect of routing data from the information highway inputs 74 selected by the information channel output circuits (IC01 186 and ICO0 188) of the PLS to the information highway outputs 72 selected by the information channel input circuits (ICI1 182 and ICI0 184) of the same PLS. Thus, a PLS in the loopback mode can switch data between selected information highway inputs 74 and selected information highway outputs 72 without involving a station device. In the medium data rate configuration, the input of ILC 187 of PLS0 selects the output of OLC 189 of PLS0. This has the effect of routing the data from the information highway inputs 74 selected by ICO1 186 and ICO0 188 of PLS0 to the information highway outputs 72 selected by ICI1 182 and ICI0 184 of PLS0, respectfully, and routing the data from the information highway inputs 74 selected by ICO1 186 and ICO0 188 of PLS1 to the information highway outputs 72 selected by ICI1 182 and ICI0 184 of PLS1, respectfully. Additionally, in the remote mode, a PLS in the loopback mode routes the packet data from the microprocessor through PCO 190 and back through PCI 185 where it can be accessed by the microprocessor. Thus, the operation of the packet channel logic can be tested prior to routing any data to a station device connected to that PLS.

The operation of PLS2 in the loopback mode in the medium data rate configuration has similar effects on PLS2 and PLS3. In the high data rate configuration, ILC 187 of PLS0 selects the output of OLC 189 of PLS0. The data from the information highway inputs 74 selected by the information channel output circuits (ICO1 186 and ICO0 188) of each PLS is routed to the information highway outputs 72 selected by the corresponding information channel input circuits (ICI1 182 and ICI0 184) of each PLS.

GENERAL DESCRIPTION OF THE DIAGNOSTIC CHANNEL

Figure 6:
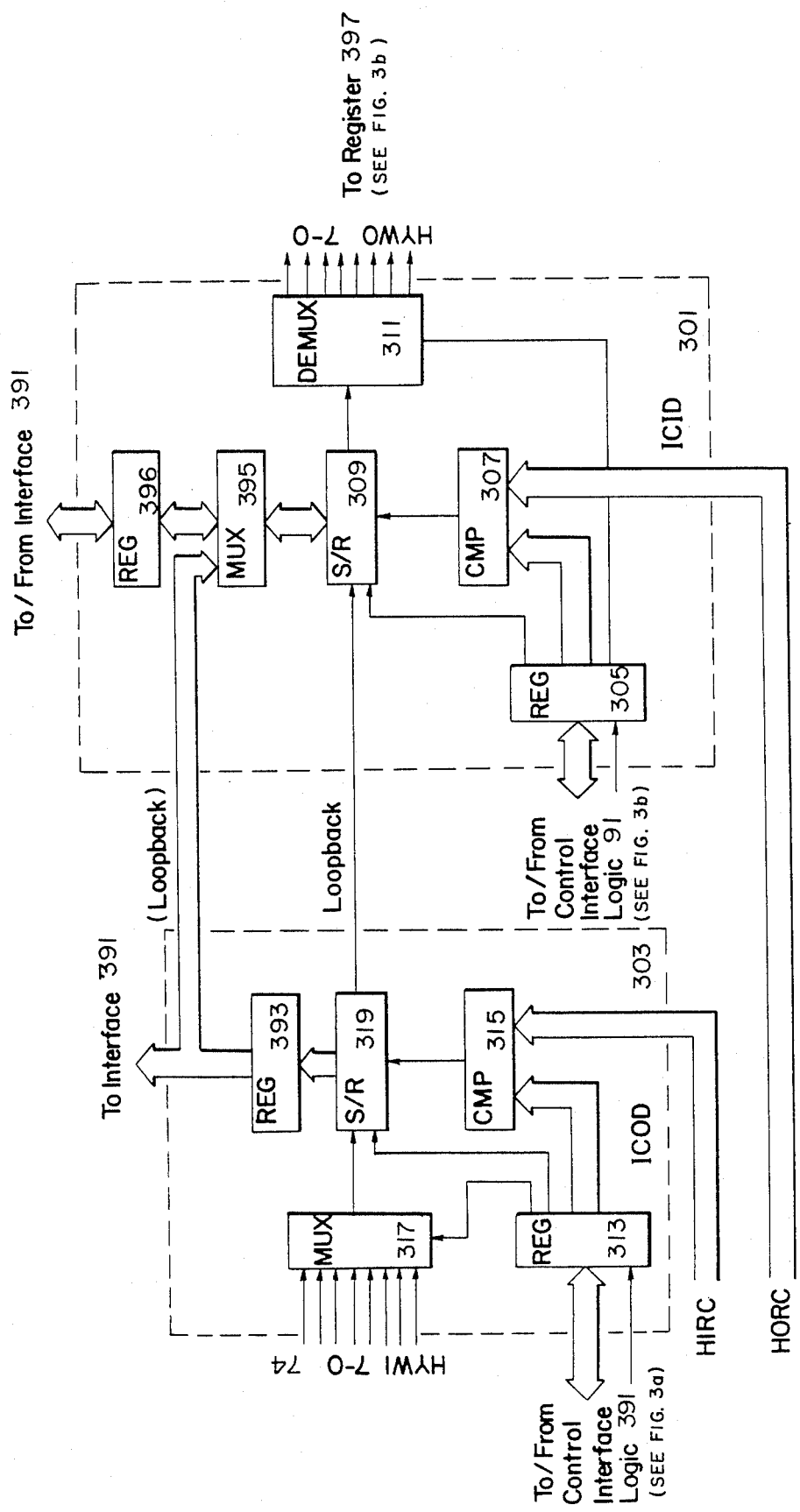
FIG. 6 is a block diagram of the optional diagnostic channel.

FIG. 6 is a block diagram of the optional diagnostic channel of the QPLS. As shown in FIG. 6, the diagnostic information highway read channel (ICOD) 303 receives serial information of a selected bandwidth from a selected channel of a selected information highway input 74. The serial information received is stored as eight bits of parallel data, and can be read by the microprocessor. The diagnostic channel can operate in either the loopback mode or in the microprocessor controlled mode. In the diagnostic channel loopback mode, the stored data is available to the diagnostic information highway write channel (ICID) 301, which can then transfer the data to a selected channel of a selected information highway output 72 at a selected bandwidth. Alternatively, in the normal mode, the microprocessor can communicate eight bits of data to a holding register in ICID 301 via the control interface logic 391, shown in FIG. 4. In this mode, the data from the microprocessor can be transmitted to the selected information highway until changed or disabled. The diagnostic channel may be used to test the information highways by providing a means of switching data between information highway inputs 74 and information highway outputs 72, or between information highway inputs 74 and outputs 72 and the microprocessor 23 without using the PLS's or a station device.

DETAILED DESCRIPTION OF THE QPLS

Figure 5:
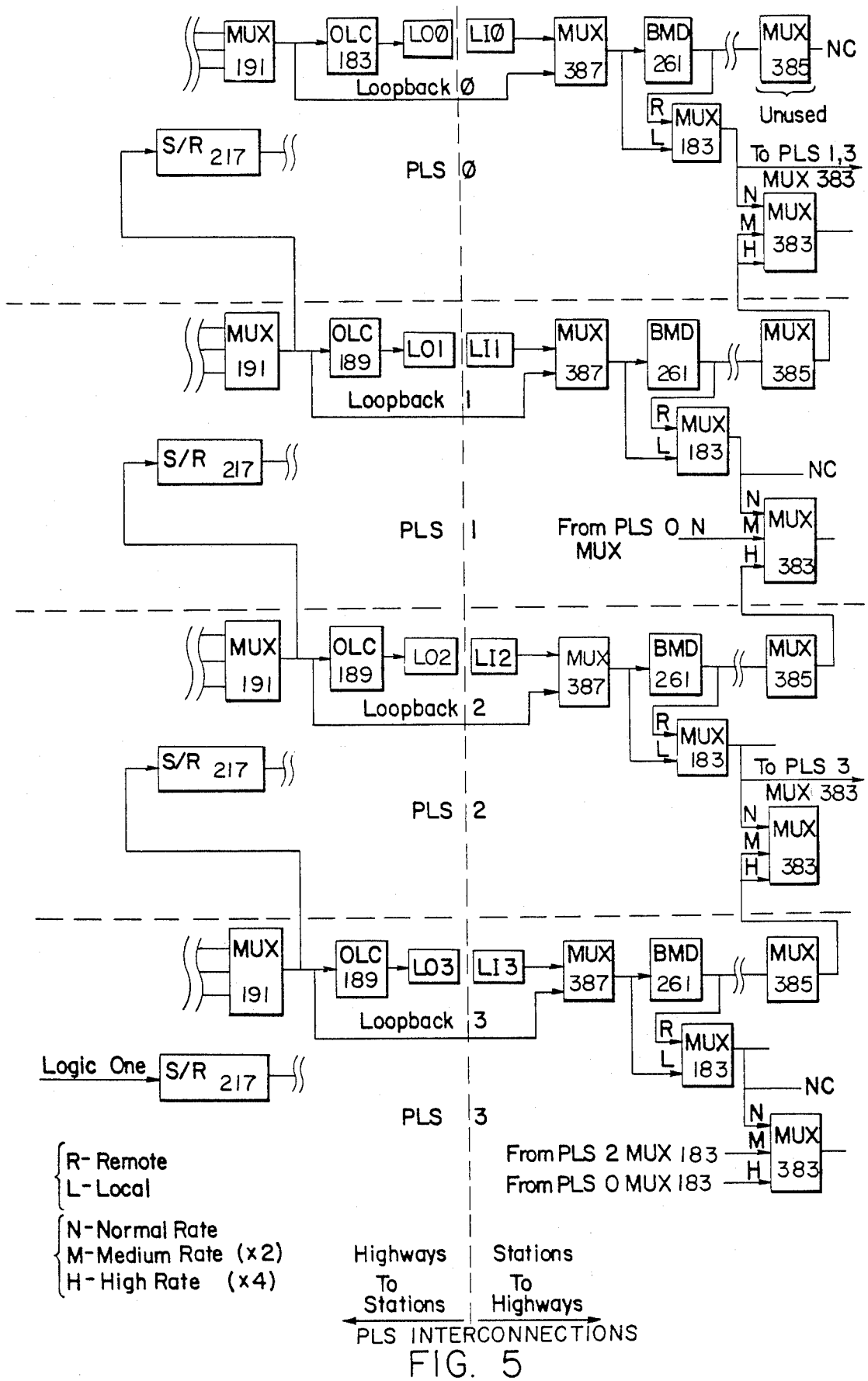
FIG. 5 is a block diagram showing the interconnections between four exemplary Per Line Switches.

A more detailed description of the operation of the various parts of each PLS follows and is referenced to the detailed block diagrams of FIGS. 3, 5 and 6, and the QPLS I/O Address Assignment Table.

DESCRIPTION OF THE INFORMATION CHANNEL OUTPUT CIRCUITS

As shown in FIG. 3(a), information channel output circuit 1 (ICO1 186) and information channel output circuit 0 (ICO0 188) are logically substantially identical and the following description of the operation of ICO1 is applicable to ICO0. In the preferred embodiment, information channel register 211 is a 16-bit register which receives the control information for ICO1 186. The control information in register 211 is loaded from the microprocessor 23 via control interface logic 391 (shown in FIG. 4). The signal from microprocessor 23 to register 211 sets register 211 to enable an input from an information highway at a particular time, and for a particular bandwidth. Since the microprocessor transfers data in bytes of eight bits, the data required for register 211 is transferred in two eight-bit bytes. The first eight-bit byte of data is stored in a temporary register (not shown), and both bytes are transferred to register 211 when the second byte is transferred from the microprocessor. In the preferred embodiment, the format of the data in the information channel registers 211 and 209 is as follows:

| Information Channel Register Format |
|---|
| H2 H1 H0 B1 B0 E C9 C8 C7 C6 C5 C4 C3 C2 C1 C0 |

The 3 most significant bits of the register 211, H2, H1 and H0, control the multiplexer 219 which gates one of the eight information highway inputs (HYWI7-HYWI0) to the shift register 215. The highway selection is typically encoded as follows:

| H2 | H1 | H0 | Highway |
|---|---|---|---|
| 0 | 0 | 0 | HYWI0 |
| 0 | 0 | 1 | HYWI1 |
| 0 | 1 | 0 | HYWI2 |
| 0 | 1 | 1 | HYWI3 |
| 1 | 0 | 0 | HYWI4 |
| 1 | 0 | 1 | HYWI5 |
| 1 | 1 | 0 | HYWI6 |
| 1 | 1 | 1 | HYWI7 |

The least significant ten bits in register 211, C9-C0, define the starting location of a message time slot in the information frame. Referring to FIG. 7, the data on the information highway inputs during each cycle of the highway input clock occupies a time slot in the information frame. Each time slot has a duration of approximately 490 nanoseconds at 1,024 kilobits per second, 245 nanoseconds at 2,048 kilobits per second, and 122 nanoseconds at 8,192 kilobits per second. in the preferred embodiment, the information frame has a duration of 125 microseconds, and the time slots are thus repeated 8,000 times per second. The ten bits, C9-C0, can provide the binary representation of each of the 1,024 time slots in the message frame operating at 8.192 kilobits per second. Only nine bits, C8-C0, are required to represent each of the 512 time slots at 4,096 kilobits per second, and only eight bits, C7-C0, are required to represent the 256 time slots at 2,048 kilobits per second.

Bits C9-C0 from register 211 are compared in comparator 213 with the output of counter HIRC 223. Counter HIRC 223 is a ten-bit binary counter which is reset to zero (0000000000) with each occurrence of an active signal on the information highway frame sync input FSI 78. Each of the clock signals on the highway input clock HIC 76 will cause HIRC 223 to increment by one count. Thus, the ten outputs of HIRC 223 will provide the binary representation of the current time slot location within an information frame. If the information rate on the input highways is 8,192 kilobits per second, HIRC 223 will count from zero (0000000000) to 1,023 (1111111111) before being reset by FSI 78. Similarly, at 4,096 kilobits per second, HIRC 223 will count from zero to 511, and at 2,048 kilobits per second, HIRC 223 will count from zero to 255.

If the ten binary outputs of HIRC 223 match bits C9-C0 from register 211, the output of comparator 213 will be active to enable shift register 215 and shift the data from the selected information highway from multiplexer 219 into shift register 215. The number of bits of data shifted into shift register 215 will depend upon the bandwidth selected by bits B1 and B0 of register 211.

The bandwidth selection is typically encoded as follows:

| B1 | B0 | Bandwidth |
|---|---|---|
| 0 | 0 | 1 bit |
| 0 | 1 | 2 bits |
| 1 | 0 | 4 bits |
| 1 | 1 | 8 bits |

The bandwidth bits, B1 and B0, are also inputs to comparator 213 and selectively disable the three least significant bits of the comparator. If the selected bandwidth is one bit, all ten bits of HIRC 223 must be the same as C9-C0 of register 211 before the output of the comparator will be active to enable shift register 215. Thus, there will only be one successful comparison in each information frame, and, as explained in more detail in connection with FIG. 3(c), shift register 215 will only shift in one bit from multiplexer 219. If the selected bandwidth is two bits, the least significant bit of the comparator is disabled. Thus, there will be two successful compares per information frame since the comparator cannot distinguish between two counts differing only by the least significant bit. For example, count 19 (00010011) will compare the same as count 18 (00010010). The output of comparator 213 will therefore enable the shift register 215 to shift in two bits from multiplexer 219. In like manner, comparator 213 will not check the least significant two bits of HIRC 223 to allow register 215 to shift in four bits, and will not check the least significant three bits to allow register 215 to shift in eight bits. In an alternative embodiment (no shown), the bandwidth can be selected as 3, 5, 6, or 7 bits.

Control register 211 also has a bit designated as E. this bit when set enables the output of the comparator 213. If it is not set, the output of comparator 213 is disabled and shift register 215 will not be enabled at any time during the information frame. Thus, a bandwidth of zero can be selected.

Figure 3C:
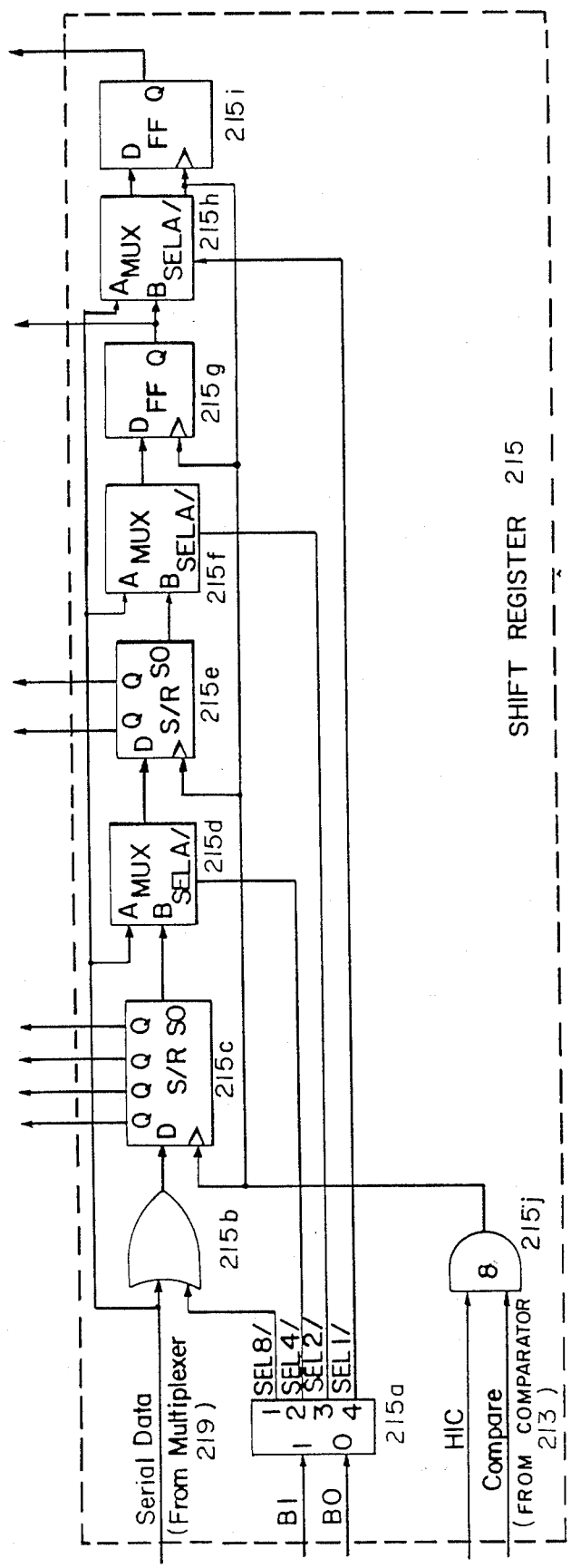
FIG. 3 is a detailed block diagram of one Per Line Switch showing data flow from the information highways to the station port in FIG. 3(a), showing data flow from the station port to the information highways in FIG. 3(b), and showing a detailed block diagram of an input shift register in FIG. 3(c).

At the end of the information highway frame, the data in shift register 215 is parallel loaded into shift register 217. As previously described, the transfer to shift register 217 is controlled by the status of B1 and B0. Although illustrated as a single shift register in FIG. 3(a), shift register 215 is, in the preferred embodiment, comprised of multiple stages as illustrated in FIG. 3(c). Decoder 215(a) generates one of four output signals, sel8/, sel4/, sel2/ or sel1/ depending upon the bandwidth selection by bits B1 and B0 described above. B1 and B0 activate sel8/ when an eight bit bandwidth is desired. When sel8/ is activated, OR-gate 215(b) will enable the serial data from the information highway input multiplexer 219, described above. Eight HIC clock edges enabled by comparator 213 through AND-gate 215(j) will cause the data from OR-gate 215(b) to be shifted through the four-bit shift register stage 215(c), multiplexer 215(d), two-bit shift register 215(e), multiplexer 215(f), flip-flop 215(g), multiplexer 215(h) and into flip-flop 215(i). The Q-outputs of 215(c), 215(e), 215(g), and 215(i) will be transferred to shift register 217. Multiplexers 215(d), 215(f) and 215(h) are adapted to select their B inputs because their select lines are inactive in the eight-bit bandwidth configuration.

If a bandwidth of four bits is selected, decoder 215(a) will activate the sel4/ line. OR-gate 215(b) will not be enabled by sel8/ and, therefore, will force all "ones" into shift register 215(c). In response to sel4/, multiplexer 215(d) will select the direct serial data from multiplexer 219. Four HIC clock edges enabled by comparator 213 through AND-gate 215(j) will shift the data through shift register 215(e), multiplexer 215(f), flip-flop 215(g), multiplexer 215(h) and into flip-flop 215(i). Shift register 215(b) will have four "ones" on its outputs. The operation of the circuits for bandwidths of two and one are similar, with the first data bit in the input stream from multiplexer 219 shifted into flip-flop 215(i) and the remaining data bits or fill data of all ones shifted into the other shift registers. As a result of the selective shifting of data through the stages of register 215, the most significant bit of data from the information highway input will be in the most significant bit position of register 215 at the end of the frame for any selected bandwidth. Thus, the data will be transferred to shift register 217 with the most significant bit of data from the information highway input in the most significant bit portion of shift register 217.

The operation of information channel output 0 (ICO0 188) is independent of but identical to information channel output 1 (ICO1 186). It can select an information highway and a time slot on the highway totally independent of the selection of ICO1. As described previously, the information channels do operate together to shift the information data from shift registers 217 and 203 to the station device. In order to accomplish this, the serial output of shift register 217 of ICO1 186 is the serial input to shift register 203 of ICO0 188 as shown in FIG. 3(a). In order to provide the interconnections to configure the highway-to-station circuits of the PLS's in the medium and high data rate configurations, the input to shift register 217 of ICO1 186 will be the output of the output line control logic of the next higher numbered PLS. For example, the input to shift register 217 for PLS0 will be the output of the output line control logic (OLC 189) of PLS1. In the local mode, multiplexer 191 in the output line control logic (OLC 189) of the next higher PLS is controlled such that the input to shift register 217 of a PLS will be the output of shift register 203 of the next higher numbered PLS. In the remote mode, multiplexer 191 selects the unencoded output of shift register 201 through multiplexer 195 in the packet channel logic (PCO 190). FIG. 5 shows the interconnections between the PLS's which provide for the transfer of serial information between the PLS's in the medium and high data rate configurations.

DESCRIPTION OF THE PACKET CHANNEL OUTPUT LOGIC CIRCUIT

In the preferred embodiment, the packet channel output (PCO 190) is bypassed in the local mode, and the output of shift register 203 is communicated directly to multiplexer 191 in the output line control logic OLC 189. The output of OLC 189 is in turn communicated to the station port, via buffer 389, or to ICO1 186 of the next PLS, as shown in FIG. 2 and in FIG. 5.

In the remote mode, the packet out control logic 221 receives timing signals from the highway input clock (HIC) 78, the highway frame sync input (FSI) 76, and the line clock (LC) 88, and receives control signals from the microprocessor 23 via the control interface logic 391 (shown in FIG. 4). In response to the control and timing signals, the packet out control logic 221 controls the contents of the first eight bits of data in each frame sent to the device 90 connected to the station port.

The format of the first eight bits of data sent to the station port through output line control (OLC) 189 is shown in FIG. 9. During those periods in which no packet data is being transmitted to the station device by the external control means, the eight bits will contain the following idle states. The first bit to be transmitted is the sync bit, S, which alternates states once each frame. The second bit to be transmitted is the packet flag bit which will be in the reset state (1). The third through sixth bits to be transmitted comprise the four packet data bits which, during idle periods, contain all ones. The seventh bit to be transmitted is the K flag which, during idle periods, is in the reset state (1). The eighth bit to be transmitted is always in the zero state.

When the packet data register 199 is loaded, a packet flag within the packet out channel control logic 221 is set. This action causes PCO 190 to exit the idle state and enter a busy state, and an indication of this status (busy) is made available to the external control means. At the beginning of the frame following the frame in which the packet data was loaded, the shift register 201 will be loaded with the following states. The first bit will be loaded with the current state of S, the second bit will be loaded with the set state (0) of the packet flag PF, the third through sixth bits will be loaded with the four least significant bits of the loaded packet data from register 199, the seventh bit is loaded with the reset state (1) of the K flag, and the eighth bit is loaded with a zero. The next consecutive frame will contain the same status with the updated state of S and the four most significant bits of packet data from register 199.

If the microprocessor does not cause the packet register 199 to be reloaded with data within 250 microseconds (two frames), following the last load, the K flag is set (0) to indicate that the data in the next frame is fill data, of all 1's within an active packet message, which should be ignored by the device connected to the station port. The packet out control logic 221 will continue to send packet data as received or send fill data until the microprocessor causes the packet flag (PF) to be reset by executing a write command to the appropriate address of the control interface logic 391 (shown in FIG. 4). When that occurs, the internal packet flag is reset. The PLS will typically send four additional frames of packet data, which will consist of the sixteen bits of cyclic redundancy checking (CRC) data, before resetting the packet flag in the data sent to the station device. After outputting the CRC data, the packet out control logic 221 will re-enter the idle state with operation as previously described.

A typical format for the control and signaling information generated by the packet channel output logic PCO 190 is shown in detail in FIGS. 9(a), 9(b) and 9(c). The four bits labelled "PD" are the bits from the microprocessor; "K" is the K flag; "PF" is the packet flag to the station device; and "S" is a synchronization bit which alternates between its set and reset states in successive frames.

The data from shift register 201 is communicated to the cyclic redundancy generation circuit (CRC 197). Only the four bits of recognizable packet data from each frame is shifted through the CRC 197. Furthermore, only that packet data with the packet flag (PF) set (0) and the K flag reset (1) is shifted through. When the packet flag (PF) is reset (1), the packet out control logic 221 causes the sixteen bits of data accumulated by the CRC 197 to be communicated to the multiplexer 195 and to be subsequently output to the station device as the last four frames of packet data. When a typical station device receives the reset packet flag, it can per-form a cyclic redundancy check on the accumulated data to determine whether there were any errors in the received data. Cyclic redundancy generation and checking circuitry is well known to the art. For example, a description of a typical cyclic redundancy generating and checking circuit can be found in *Encyclopedia of Computer Science and Engineering*, 2nd Ed., Van Nostrand Reinhold Co., Inc., 1983, at pp. 434-437.

DESCRIPTION OF THE BIPHASE MARK ENCODER CIRCUIT

The output of multiplexer 195 is input to the biphase mark encoder (BME 193) which converts the nonreturn to zero (NRZ) output of multiplexer 195 to biphase mark encoded data. In general, the biphase mark encoder assures that each bit time of the output data will include at least one transition from the high to low logic state, or vice versa, and an exemplary format is shown in FIG. 10. Each "1" in the data stream is represented by two transitions in the bit time and each "0" by only one transition per bit time. A circuit in the receiving device can derive data and clock from the encoded signal.

The output of the biphase mark encoder 193 is transferred to multiplexer 191 which is part of the output logic circuitry 189. The other input to multiplexer 191 is the output of shift register 203 which bypasses the packet channel output logic (PCO 190) in the local mode as described above. The output of the multiplexer 191 is buffered through buffer 389 and then transmitted to an external pin to which the station port device 90 is connected. The output of the multiplexer 191 is also available in the loopback mode as an input to the input logic circuitry of the same PLS, and is available as the input to the next lower numbered PLS, as shown in FIGS. 2, 3 and 5, for configuring the PLS's as units of two or four devices for medium data rate and high data rate operation.

The sync bits generated by each PLS are all active when the PLS's are configured in the low data rate mode. In the medium data rate mode, only PLS0 and PLS2 have active sync bits, and PLS1 and PLS3 force their sync bits to an inactive (1) state. In the high data rate mode, only PLS0 has its sync bit active and PLS1, PLS2 and PLS3 all force their sync bits to an inactive (1) state.

DESCRIPTION OF THE INFORMATION CHANNEL INPUT CIRCUITS

As illustrated in FIG. 2, and as shown in more detail in FIG. 3(b) and in FIG. 5, the data from the station devices 90 is input to each PLS through the input logic circuitry ILC 187. In response to configuration commands from the microprocessor 23 through interface control logic 391 (shown in FIG. 4), ILC 187 of each PLS selects the source of the information and signaling data for the PLS in each of the various modes and configurations. Also in response to the configuration commands, each ILC 187 provides the means of configuring a plurality of the PLS's to operate in conjunction in the medium and high data rate configurations. Exemplary means of interconnecting the PLS's in the different modes and configurations are described below. The transferring of the information and the control and signaling data is also described.

LOCAL MODE

As shown in FIG. 3(b), multiplexer 387 of each PLS selects either the data from the station port in the normal mode or the data from the output of the corresponding highway-to-station circuitry in that PLS in the loopback mode. As described above with regard to the data flow from the information highways to the station ports, the output of the PLS in the loopback mode can be NRZ data or encoded data, depending upon whether the QPLS is in the local or remote mode.

In the local mode, multiplexer 183 of each PLS selects the output of multiplexer 387 of that PLS. In the remote mode, multiplexer 183 selects the output of the biphase mark decoder (BMD) 261 of that PLS. Similarly, multiplexer 385 selects either the output of shift register 157 of ICI0 184 in the local mode or the output of shift register 141 of PCI 185 in the remote mode. In the medium and high data rate configurations, the output of multiplexer 385 is an input to the next lower numbered PLS to provide a means of interconnecting the station-to-highway circuitry of the PLS's.

Multiplexer 383 in each PLS selects the input to ICI1 182 of that PLS, depending upon whether the QPLS is in the low, medium or high data rate configuration. In the low data rate configuration, multiplexer 383 selects the output of multiplexer 183 of the same PLS. As shown more clearly in FIG. 5, in the medium data rate configuration, multiplexer 383 of PLS3 selects the output of multiplexer 183 of PLS2; multiplexer 383 of PLS1 selects the output of multiplexer 183 of PLS0; multiplexer 383 of PLS2 selects the output of multiplexer 385 of PLS3; and multiplexer 383 of PLS0 selects the output of multiplexer 385 of PLS1. As also shown in FIG. 5, in the high data rate configuration, multiplexer 383 of PLS3 selects the output of multiplexer 183 of PLS0; multiplexer 383 of PLS2 selects the output of multiplexer 385 of PLS3; multiplexer 383 of PLS1 selects the output of multiplexer 385 of PLS2; and multiplexer 383 of PLS0 selects the output of multiplexer 385 of PLS1.

In the local mode, in the low data rate configuration, the data in each PLS is transferred from the output of multiplexer 387, through multiplexer 183, and through multiplexer 383 to the serial input to shift register 169 of ICI1 as shown in FIG. 3(b). Typically, sixteen clock edges per frame generated by control interface logic 391 (shown in FIG. 4), using the highway input clock (HIC) 78 and frame sync input (FSI) 76 as a reference, will cause the data to be shifted through shift register 169 of ICI1 and shift register 157 of ICI0 until the first bit of information data is in the most significant bit position of shift register 157. In the medium data rate configuration in the local mode, typically 32 clock edges will cause the information data entering through multiplexer 387 of PLS2 in one frame to be shifted through shift registers 169 and 157 of PLS3 and then through shift registers 169 and 157 of PLS2 via multiplexer 385 of PLS3 and multiplexer 383 of PLS2; and will cause the information data entering through multiplexer 387 of PLS0 to be shifted through shift registers 169 and 157 of PLS1 and then through shift registers 169 and 157 of PLS0 via multiplexer 38 of PLS1 and multiplexer 383 of PLS0. In the high data rate configuration, the information data will enter through multiplexer 387 of PLS0, and, typically after 64 clock edges, the data will be shifted through registers 169 and 157 of PLS1, and registers 169 and 157 of PLS0, in that order, via the multiplexer selections described above.

REMOTE MODE

In the remote mode, the shifting of the input data is similar except, as previously described, the data from the station devices comprises control and signaling information as well as the information data. In the low data rate configuration, the data from each station device is input through multiplexer 387 of each PLS and then through the biphase mark decoder (BMD) 261 which generates a synchronous clock and NRZ data from the encoded signal. The NRZ output of BMD 261 is transferred through multiplexer 183 and multiplexer 383 to shift register 169 of ICI1. After 24 clock edges, the data will be shifted through shift register 169 of ICI1 and shift register 157 of ICI0 and then through shift register 155 of PCO 185. The control and signaling information in each frame will be in shift register 155 after the shifting is complete. In the medium data rate configuration in the remote mode, 48 clock edges derived by BMD 261 of PLS2 will shift the data from BMD 261 of PLS2 through shift registers 169, 157 and 155 of PLS3 and then through shift registers 169, 157 and 155 of PLS2 via the previously described connections. Similarly, the data from BMD 261 of PLS0 will be shifted through the corresponding registers of PLS1 and PLS0 by 48 clock edges from BMD 261 of PLS0. In the high data rate configuration in the remote mode, after 96 clock edges derived by BMD 261 of PLS0, the data from BMD 261 of PLS0 is shifted through shift registers 169, 157 and 155 of PLS3, PLS2, PLS1 and PLS0 in that order via the previously described connections. In each of the data rate configurations, the input message control (IMC) 181 of each PLS will monitor the packet flag and fill flag in the control and signaling data shifted through shift register 155 of PCO 185 of the PLS and will verify that the message is in synchronization by checking the alternating state of the sync bit S. If the packet flag is set and the fill flag is not set, the four bits of packet data in each frame will be shifted from shift register 155 into shift register 151 and into cyclic redundancy checker (CRC) 153 of PCI 185. The further operation of PCI 185 will be described in more detail below.

TRANSFER OF DATA WITHIN INFORMATION CHANNEL INPUT CIRCUITS

The operation of the station-to-highway circuitry in ICI1 and ICI0 of each PLS is substantially the same whether the QPLS is configured in the low, medium or high data rate configurations or whether the QPLS is in the local or remote mode. In either the local or the remote mode, the parallel output of shift register 169 of ICI1 may be transferred to buffer 171 upon receipt of the next frame sync output signal on FSO 80. The data in buffer 171 from the previous frame may be simultaneously transferred to shift register 173 on the same signal on FSO 80. Thus, the data in shift register 169 is delayed by one full frame (125 microseconds) before being transferred to shift register 173. This allows the synchronization of data from an asynchronous station port to the frame timing of the information highway outputs 72. In like manner, the parallel output of shift register 157 is transferred to buffer 159 and then to shift register 161 in ICI0. In the local mode, buffers 171 and 159 can be bypassed if the line buffer bypass bit (B) is set in the control interface logic 391 (shown in FIG. 4). Typically, this will be done if the highway input clock (HIC) 78 and highway output clock (HOC) 82 are tied together, and the frame sync input (FSI) 76 and the frame sync output (FSO) 80 are tied together. This would cause the information highway inputs 74 and information highway outputs 72 to be synchronized.

In the preferred embodiment, register 177 in the information channel input logic (ICI1 182) shown in FIG. 4 has the same format as register 209 and register 211 in the information channel output logic (ICO0 and ICO1). The ten-bit counter (HORC 225) is reset with the signal on frame sync output (FSO) 80 and is clocked by the highway output clock (HOC) 82. The ten bits from the counter (HORC 225) are input to comparator 175 and are compared with the channel selection information in the ten least significant bits of register 177. Bits B1 and B0 of register 177 control the compare logic 175 in the same manner as the compare logic 207 and 213 in the information channel output logic. When the output of HORC 225 is identical to the channel selection bits (C9–C0) in register 177, the compare logic will generate 1, 2, 4, or 8 clock edges, depending upon the bandwidth selected by bits B1 and B0, and will shift data out of shift register 173 into the demultiplexer 179. Thus, C9–C0 and B1–B0 define a time slot on a highway. The demultiplexer 179 is controlled by bits H2, H1, and H0 of register 177 and selects one of the eight information highway outputs. If bit E of register 177 is set, the data from shift register 173 will be inserted on the selected information highway output (HYWO7–HYWO0) 72 after being synchronized with HOC 82 in register 397. Otherwise, the selected information highway output 72 will not be affected.

The control register 165, compare logic 163, and demultiplexer 167 in information channel input 0 (ICI0 184) operate in the same manner as in information channel 1 (ICI1 182). The operation of information channel input 0 (ICI0 184) and information channel input 1 (ICI1 182) in each PLS is controlled independently.

ALTERNATIVE EMBODIMENT

In an alternative embodiment, the amount of circuitry required for implementation of the device can be reduced by providing only one channel register for each of the two channels in each PLS. Thus, rather than considering the station-to-highway and highway-to-station sections of each channel separately as has been done heretofore (i.e., ICO1 and ICI1), each channel of each PLS can be considered as a unit. One register can then be used to select the time slot during which the channel is active and to select the direction of data flow on the selected information highways. A separate bit in the register selects the direction of data flow. Each channel operates on two information highways which are selected by the register. Each channel will receive data from one information highway and transmit data on another information highway. If the status of the direction bit is changed, the use of the two information highways is reversed. In this alternative embodiment, the information highway inputs 74 and the information highway outputs 72 are the same physical units, and data can be sent in either direction on the highways under control of the direction status bit in each PLS. The use of this alternative embodiment can enhance the utilization of the available time slots in a given information frame since two PLS's can accomplish complete bidirectional (i.e., full duplex) communication in only one time slot. One PLS will transmit on one highway during the time slot while receiving on another highway. The PLS with which it is communicating will transmit on the highway on which the first PLS is receiving and will receive on the highway on which the first PLS is transmitting. Changing the status of the direction bit in each of the two PLS's will reverse the direction of data flow on the two information highways. This has been found to be particularly advantageous at a system level wherein the allocation of time slots for communications between two PLS's at a local level must be compatible with the system allocation. Thus, since full duplex communications between two PLS's can be accomplished with only one time slot, this alternative implementation can effect a savings in system resources as well as a savings in device complexity. In this alternative embodiment, the highway input clock (HIC) 78 must be the same as the highway output clock (HOC) 82 and the frame sync input (FSI) 76 must be the same as the frame sync output (FSO) 80.

DESCRIPTION OF THE PACKET CHANNEL INPUT LOGIC

Referencing FIG. 3(b), the packet in control logic 392 of each PLS will keep track of the packets which are input to shift register 151 of the PLS in the remote mode. When eight bits of packet data have been shifted into shift register 151, the packet in control logic 392 will, providing that the end-of-message (E) status is not set and providing that six bytes of packet data are not already stored in the FIFO 149, parallel load the packet data into the six-byte first-in/first-out register, FIFO 149. The data available status bit (D) is set for that PLS. The status bit (D0 for PLS0, D1 for PLS1, etc.) are available as inputs to the microprocessor to indicate which FIFO's 149 have active packet data. The first byte of data in the FIFO 149 is available on the output of the FIFO 149 to be read by the microprocessor. The FIFO 149 has an internal FIFO counter which is incremented for each byte of packet data received from the device connected to the station port, and is decremented for each byte of packet data which is read by the microprocessor. The FIFO counter is not affected by fill data. When the fifth byte of data is loaded into the FIFO the FIFO full (FF) flag is set (1) which causes the status interrupt flag (I0 for PLS0, I1 for PLS1, etc.) to be set (1) and causes an interrupt to be transmitted to the microprocessor. The microprocessor can read the QPLS interrupt status (Address 08) to determine the source of the interrupt. Although it is recognized that various signal formats may be implemented without departing from the scope of the invention, the format of the interrupt status in the presently preferred embodiment can be as follows:

---
I3 I2 I1 I0 D3 D2 D1 D0
---

The FIFO 149 will hold one additional byte after the FIFO full (FF) flag is set. If a seventh byte of packet data is attempted to be loaded into the FIFO 149, the FIFO overrun (OR) flag is set (1). Only the first six bytes of data in the FIFO are retained.

The packet data received by the QPLS with the packet flag (PF) set (0) and the fill flag (K) reset (1) is also transferred in the cyclic redundancy checker CRC 153. When the packet flag (PF) is reset (1) in the input data stream, the outputs of the CRC 153 are checked to determine whether an error has been detected. If an error is detected, the CRC status bit (C) will be set (1) and will be available to the microprocessor when the PLS packet status is read. The resetting of the packet flag (PF) also sets (1) the end of message status bit (E), which causes the interrupt flag (I0 for PLS0, I1 for PLS1, etc.) to be set (1), and causes an interrupt to be transmitted to the microprocessor on the interrupt line (INT) 410. When the end of message status bit (E) is set, the last two bytes of data in the FIFO 149 typically should be ignored since they contain data which was generated by the CRC generator in the station device and do not contain packet message data; however, some diagnostic tests may utilize this CRC data.

If the overrun status bit (OR) becomes set after the end of message status bit (E) is set, there has been an overrun of packet messages such that the station device began sending a second message while the FIFO has data from the first message.

DESCRIPTION OF INPUT MESSAGE CONTROLLER

Each remote station device will input station messages in a synchronized manner to maintain an in-frame sync state. This is monitored in the input message controller IMC 181 of each PLS which hunts for the alternating polarity of the message sync (S) bit (first bit of a station message) in the station input. When sync is located, the station message bit counter count is adjusted to coincide with it. Whenever the in-frame sync state is lost, the IMC 181 will set a frame error flag (FE) (which must be reset by the microprocessor) and automatically enters a hunt-frame sync state until the in-frame sync state is re-established. While hunting, the status bit hunt (H) will be active and data transfers from the associated station device are inhibited until the next full frame after sync is re-established.

DESCRIPTION OF ADDITONAL FEATURES OF QPLS

The QPLS also has the optional capability (not shown) of making the current data outputs of the CRC checker available as inputs to the microprocessor or other external control means. If the received CRC read enable bit (CR) is set, all PLS's in the QPLS operate in this mode. The QPLS also has the capability of setting the transmitter CRC read enable bit (CS) which will transmit the CRC data to the station device as the four-bit packet information in each frame rather than the actual packet data. These two modes are principally used for chip testing and are not necessary for normal operation.

THE DIAGNOSTIC CHANNELS

The QPLS also has two independent diagnostic channels; one, ICOD 303, for reading from information highway inputs 74, and the other, ICID 301, for writing to the information highway outputs 72. The diagnostic channels are shown in FIGS. 2 and 6 and have been briefly described above. The operation mode of the diagnostic channels is controlled by status bit, L4, which selects either the normal (L4 reset (0)) or the loopback (L4 set (1)) mode. In both modes, the diagnostic output channel (ICOD 303) reads data from the selected channel of a selected information highway input 74 into an eight-bit shift register 319 in the manner previously described for ICO1 186, utilizing the same timing. The information highway input 74 is selected by multiplexer 317 under control of register 313 and comparator 315. The data is loaded from the information highway shift register 319 into register 393 on the occurrence of the frame sync signal on FSI 76. The data stored in register 393 may be read by the microprocessor via the QPLS parallel port.

The diagnostic input channel (ICID 301) writes data to the selected channel of the selected information highway output 72 in the manner as described for ICI1 182, utilizing the same timing. The source of the data to be written to the highway is controlled by the selected mode. In the normal mode, data stored in register 396 by the microprocessor through the control interface logic 391 (shown in FIG. 4) is transferred through multiplexer 395 to shift register 309 at the occurrence of an active signal on FSO 80 in each frame. The data in shift register 309 is shifted through demultiplexer 311 to the information highway outputs 72 under control of register 305 and comparator 307.

In the loopback mode, the data stored in register 393 is transferred through multiplexer 395 to shift register 309 at the occurrence of the signal on FSO 80 in each frame. The data in shift register 309 is shifted through demultiplexer 311 to the information highway outputs 72 under control of register 305 and comparator 307.

INTERFACE LOGIC AND ADDRESS ASSIGNMENTS

The QPLS also contains random interface logic, shown on the block diagram in FIG. 4 as interface control logic 391, which receives address, data, read/write control and a strobe from the microprocessor, and generates the internal control signals which cause the microprocessor data to be routed to the various internal registers. This is accomplished by activating select signals to the multiplexers shown in the block diagrams. The QPLS I/O address assignments are shown in the QPLS I/O Address Assignment Table. As will be apparent to those skilled in the art, various address assignments may be used without departing from the scope of the invention. The address assignments set forth below and in the QPLS I/O Address Assignment Table in hexadecimal format are thus only exemplary of the preferred embodiment of the invention. The control interface logic 391 also contains frequency conversion logic for developing the clocking required by the shift registers and other logic by deriving clocks at various rates from the line clock input on LC 88 and from the outputs of the biphase mark decoders 261.

| | QPLS I/O ADDRESS ASSIGNMENT TABLE | |
|---|---|---|
| Address (HEX) | READ | WRITE |
| 00 | Packet data in 0 | Packet data out 0*3 |
| 01 | Packet status 0*1 | Reset PF0 |
| 02 | Packet data in 1 | Packet data out 1*3 |
| 03 | Packet status 1 | Reset PF1 |
| 04 | Packet data in 2 | Packet data out 2*3 |
| 05 | Packet status 2*1 | Reset PF2 |
| 06 | Packet data in 3 | Packet data out 3*3 |
| 07 | Packet status 3*1 | Reset PF3 |
| 08 | Interrupt Status (I3-I0, D3-D0) | Packet status Reset*4 |
| 09 | QPLS Status | (V5-0, EF, SA) — |
| 0A | Mode-L (0,0,N,L4-0) | Mode-L Same as READ |
| 0B | Mode-H*2 | Mode-H Same as READ |
| 0C | HDW REG | SAME AS READ |
| 0D | HDR REG | — |
| 0E | DIAG CHAN REG OUT | SAME AS READ |
| 0F | DIAG CHAN REG IN | SAME AS READ |
| 10 | PLS0 CHAN REG 0 out | Same as READ |
| 11 | PLS0 CHAN REG 0 in | Same as READ |
| 12 | PLS0 CHAN REG 1 out | Same as READ |
| 13 | PLS0 CHAN REG 1 in | Same as READ |
| 14 | PLS1 CHAN REG 0 out | Same as READ |
| 15 | PLS1 CHAN REG 0 in | Same as READ |
| 16 | PLS1 CHAN REG 1 out | Same as READ |
| 17 | PLS1 CHAN REG 1 in | Same as READ |
| 18 | PLS2 CHAN REG 0 out | Same as READ |
| 19 | PLS2 CHAN REG 0 in | Same as READ |
| 1A | PLS2 CHAN REG 1 out | Same as READ |
| 1B | PLS2 CHAN REG 1 in | Same as READ |
| 1C | PLS3 CHAN REG 0 out | Same as READ |
| 1D | PLS3 CHAN REG 0 in | Same as READ |
| 1E | PLS3 CHAN REG 1 out | Same as READ |
| 1F | PLS3 CHAN REG 1 in | Same as READ |

*1 (FE,H,OR,C,OE,PB,FF,E)
*2 (S1,S0,CI,B,CS,CR,R1,R0)
*3 sets associated PF flag
*4 (3-0) resets FE, OR, C, E in the selected PLS's
FE = Frame Error          I = Interrupt
H = Hunting               D = Data available
OR = Overrun              V = Version number
C = CRC error             EF = Even frame
OE = Output empty         SA = Second address
PB = Packet busy          N = Local mode
FF = FIFO Full            L = Loopback
E = End of message        S = Highway data rate
CI = Chip initialize      B = Line buffer bypass
CS = CRC send data        CR = CRC receive
R = Rate select           HDW = Highway Data Write
HDR = Highway Data Read
out = data transferred from QPLS to external device/PCB logic

| QPLS I/O ADDRESS ASSIGNMENT TABLE |||
|---|---|---|
| Address (HEX) | READ | WRITE |

-continued in = data transferred from external device/PCB logic to QPLS

Addresses 00 through 07 are used to access the packet channel logic. For example, Packet Data In 0 which is read from the QPLS when the microprocessor imposes address 00 in the address lines, is the data on the output of the six-byte FIFO 149 in PLS0. Similarly, Packet Data Out 0 is that data which may be written into the packet channel output register to be sent to the device connected to the station port for PLS0. When the microprocessor writes to address 00, it also sets the packet flag (PF) for PLS0. The packet flag is reset by executing a write to the address 01.

If the microprocessor reads from address 01, it receives the packet channel status for PLS0. The format of the packet channel status received may be as follows:

| FE H OR C OE PB FF E |
|---|

FE status bit is used to indicate that the packet channel input logic has previously received a frame error on the data input. The H status bit is used to indicate that the packet channel input logic is in the hunt-frame sync state. The OR status bit is the FIFO overrun indicator. The C status bit is the CRC error indicator. OE is the output empty status bit which indicates to the microprocessor that the next byte of packet data can be loaded. PB is the packet channel busy status bit which indicates that packet data message has been initiated by the microprocessor. It remains set until after the packet flag is reset by the microprocessor and all CRC data has been transmitted. FF is the FIFO full status bit. E is the end of message status bit which indicates that the packet in control logic 392 has detected the end of the message from the device connected to the station port. H, OE, and PB are self-clearing when the associated condition has been cleared. H will reset (0) when the in-frame sync state is true. OE will reset (0) when a byte of data is loaded into PCO 190 by the microprocessor, and will set (1) after the loaded packet data has been transmitted to the device connected to the station port. PB will reset after the CRC data of the current message has been sent to the station port. FF is reset (0) by performing a read from its associated FIFO address. E, OR and C are reset (0) by writing to the packet status reset address. FE requires a write to the packet status reset address after H has been reset and the PLS is in in-frame sync. The packet status reset address uses only the lower four bits of the data to that address. Data bit 0 resets the status of PLS0, data bit 1 resets the status in PLS1, data bit 2 resets the status of PLS2 and data bit 3 resets the status in PLS3.

If the microprocessor reads from address 09, the QPLS transmits status to the microprocessor. The six most significant bits of the data transmitted will contain the version number of the QPLS. This version number is a six-bit binary number which can be part of the mask which creates the integrated circuit. Typically, it will be used to communicate the particular revision number of the unit to the microprocessor 23 and can be used by the microprocessor to select the appropriate software to be used to control each version of the QPLS.

The least significant bit of the QPLS status is the status of the second address (SA) which may be used to determine which byte (upper byte or lower byte) is being addressed when accessing addresses 0E through 1F, the eighteen 16-bit channel registers. SA is reset (0) by activating the chip initialize input (CI) 412. Since the channel registers contain sixteen bits of information, and since the microprocessor data is typically transferred in groups of eight bits, two accesses to a register are typically required to transfer data between the channel registers and the microprocessor.

The next least significant bit, EF, is the even frame status bit. This bit is forced to the even frame state when the QPLS initialize mode bit is set, and will toggle upon receipt of each signal on the information highway frame sync output (FSI) 76 after the initialize mode bit is reset. This will enable multiple QPLS EF bits to be set to the same state.

A write to address 0A sets the bits in mode-L register, which is random logic contained within the control interface logic 391 (shown in FIG. 4). The mode bits, which control functions within the QPLS, are as follows:

| 0 0 N L4 L3 L2 L1 L0 |
|---|

The two most significant bits of the mode register controlled by this address are not used. Bit 5, N, is the local/remote mode select. When set, the QPLS is typically in the local mode. When reset, the QPLS is typically in the remote mode. Bit 4, L4, controls the diagnostic channel. When set, the diagnostic channel is in the loopback operation which has been described above. The four least significant bits L3, L2, L1, L0 control the normal and loopback operation for each of the corresponding PLS's. When the corresponding bit is set, the PLS associated with that bit will be in the loopback mode as described above. When the bit is not set, the corresponding PLS will be in the normal mode. The current contents of this mode register can be determined by reading from the same address. In the present embodiment, a signal on chip initialize sets each of the loopback bits, L4, L3, L2, L1, L0, to their active states, and bit N to the remote state.

A write command to address 0B sets certain status bits in the mode-H register. The format for the data bits in this register is as follows:

| S1 S0 CI B CS CR R1 R0 |
|---|

The most significant two bits, S1 and S0, are the highway data rate selection bits. Station port clock synchronization for proper transfer of data between station port shift registers and information channel shift registers typically requires the setting of the S1 and S0 bits to match the highway data rate reference clock (HIC) 78. Typical settings are as follows:

| S1 | S0 | Highway Data Rate |
|----|----|-------------------|
| 0 | 0 | 2048 KBPS (256 bits per frame) |
| 0 | 1 | 4096 KBPS (512 bits per frame) |
| 1 | 1 | 8192 KBPS (1024 bits per frame) |

| R1 | R0 | Station Port Data Rate |
|----|----|------------------------|
| 0 | 0 | Normal |
| 0 | 1 | Medium |
| 1 | 1 | High |

The third most significant bit, CI, is the chip initialize/normal bit. When this bit is active, highway output drivers are inhibited. The highway input station port input shift registers are therefore forced to load fill bits and the station port output lines are clamped to a constant "1" state. The chip initialize is active following power on conditions and whenever changes are performed in data rate configuration selection. In the later case, the chip initialize will prevent data from being transmitted to remote station devices or to the highways until the reconfiguration is completed. Initialize mode also resets the QPLS interrupt to prevent further interrupts from occurring and forces the EF status bit to the even frame state. When chip initialize is placed back in the normal state, all information channels will typically continue to be disabled until the occurrence of the next frame sync signal. The status bits in mode-L register and mode-H register are initialized to known states by the chip initialize signal.

The chip initialize/normal mode bit operates similarly to the QPLS input pin (CI) which is activated at power-on time or when specifically set by the external circuitry. The QPLS chip initialize input pin also forces certain mode selection which assist in QPLS testing as follows: the four station ports are placed in the loopback mode and in the high data rate (i.e., the four PLS's are interconnected); the receive CRC read and the transmit CRC read are disabled; the line buffer bypass is placed in the normal mode; the QPLS chip initialize/-normal status bit is placed in the initialize mode, which will operate as described above; the remote/local mode select is placed in the remote mode; and the highway data rate selection is in the low speed mode, i.e., 2048 KBPS (256 bits per frame). The chip initialize state will remain set until specifically reset by resetting the CI bit in the mode H register via the parallel port.

The fourth most significant bit in the mode-H register is the line buffer bypass bit, B, which typically causes buffers 171 and 159 to be bypassed in the local mode.

The fifth most significant bit, CS, is the transmit CRC enable bit. When set, the transmit CRC shift register data is typically sent as packet data to the station port.

The sixth most significant bit, CR, is the receive CRC read enable bit which typically is set to allow the microprocessor to read the current output of the packet channel input CRC circuitry rather than the packet data.

The least significant two bits, R1 and R0 are the station port data rate selection bits. When R1 and R0 are both reset, the normal data rate is typically selected and the four station ports are configured as four independent units. When R1 is not set and R0 is set, the station ports may be configured as two units with PLS3 connected to PLS2 and PLS1 connected to PLS0 and the PLS's operate at the medium data rate. When R1 and R0 are both set, the four PLS's may be connected as one unit with PLS3 connected to PLS2, with PLS2 connected to PLS1, and PLS1 connected to PLS0, and the PLS's thus operating at the high data rate. The fourth state, R1 set and R0 reset, may be used to support other implementations as the particular application requires. The data rate selection is summarized as follows:

Address 0C is the highway data write register in the diagnostic channel input (ICID 301) which is used by the microprocessor to write data to the selected information highway input 74 when the diagnostic channel is enabled. This register can be read by the microprocessor by using the same address.

If the microprocessor executes a read command on address 0D it receives the information in the highway data read register 319 in the diagnostic channel output (ICOD 303). The information will be information selected by the diagnostic channel from an information highway input 74.

Addresses 0e and 0F access the diagnostic channel control registers ICOD and ICID and addresses 10 through 1F access the PLS channel registers as shown on the QPLS I/O Assignment Table. Addresses 0E-0F and 10-1F can be written to by the microprocessor, and can be read by the microprocessor to verify their current contents.

DETAILED LOGIC DIAGRAMS AND TIMING DIAGRAMS

FIGS. 11 through 31 are detailed logic diagrams and associated timing diagrams representing individual logic elements that may be included in the modules described and illustrated in connection with the previous drawings.

As one of ordinary skill in the art will readily recognize, the structure and functions described in connection with the previous drawings may be implemented by various alternative arrangements of the logic elements. Although such equivalent detailed implementations may be used, as a matter of design choice, the particular arrangement of very basic elements is set forth in FIGS. 21 through 31 in the interest of total disclosure of the present invention.

While the principles of the invention have been described above in connection with specific apparatus and applications, it is understood that this description is made by way of example only and not as a limitation on the scope of the invention.

What is claimed is:

1. A switching device for transferring information between a plurality of information highways and between information highways and station ports, said device comprising a plurality of data switches, each data switch having a station-to-highway section and a highway-to-station section, each section being in electrical commuication with a station port and with a plurality of information highways that may operate at one of a plurality of speeds, and each section including control switches in switchable, electrical contact with said sections, said control switches being configurable to continously communicate a variable bandwidth of information among said sections and also configurable to select an input to a highway-to-station section from at least one of said plurality of information highways and to select an output from a station-to-highway section to at least one of said plurality of information highways, said data switches further including rate control circuitry that selectably connects at least two of said data switches in tandem to one of said station ports to increase the bandwidth of information communicated between said information highways and said one of said station ports.

2. The device as recited in claim 1 wherein the station-to-highway section of each said data switch includes configurable input control circuitry adapted to serially interconnect the station-to-highway sections of said at least two of said data switches in response to the information rate on the information highways and the station ports.

3. The device as recited in claim 1 wherein said rate control circuitry serially interconnects the highway-to-station sections of said at least two of said data switches in response to an increased information transfer rate between the information highways and the station ports.

4. The device as recited in claim 1 wherein the highway-to-station sections and the station-to-highway sections comprise independently configurable control registers which enable a plurality of simultaneous communications paths between the information highways and the station ports.

5. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, at least one of the highway-to-station sections comprising a highway selection control register which contains information representative of the information highways from which information is transferred, and a highway selection multiplexer which selects an information highway responsive to the information contained within the highway selection control register.

6. The device as recited in claim 5 wherein the highway selection control register is dynamically configured in response to signals from an external control means.

7. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, at least one of the highway-to-station sections comprising a message start control register which contains information representative of a selected time relative to the beginning of a message frame at which the information is transferred from selected information highways to the device, and a message start comparator circuit which enables the transfer of information from the selected highways to the device at said selected time responsive to the information contained within the message start control register.

8. The device as recited in claim 7 wherein the message start control register is dynamically configured in response to signals from an external control means.

9. A switching device for transferring information between a plurality of information highways and between information highways and station port, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, at least one of the highway-to-station sections comprising a bandwidth control register which contains information representative of an amount of information to be transferred from the information highways to the device, and a bandwidth control circuit which enables the transfer of a selected amount of information from the information highways to the device responsive to the information contained within the bandwidth control register.

10. The device as recited in claim 9 wherein the bandwidth control register contains information representing the number of bits per frame, and wherein the bandwidth control circuit enables the same number of bits per message frame.

11. The device as recited in claim 9 wherein the bandwidth control register is dynamically configured in response to signals from an external control means.

12. The device as recited in claim 1 wherein at least one of the highway-to-station sections comprises a transfer enable control register which enables the transfer of information from information highways to the device response to information in the transfer enable control register.

13. The device as recited in claim 12 wherein the transfer enable control register is dynamically configured in response to signals from an external control means.

14. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, at least one of the station-to-highway sections comprising a highway selection control register which contains information representative of the information highways to which information is transferred, and a highway selection multiplexer which selects the information highways responsive to the information contained within the highway selection control register.

15. The device as recited in claim 14 wherein the highway selection control register is dynamically configured in response to signals from an external control means.

16. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, at least one of the station-to-highway sections comprising a message start control register which contains information representative of a selected time relative to the beginning of a message frame at which the information is transferred to selected information highways from the device, and a message start comparator circuit which enables the transfer of information to the selected highways from the device at said selected time responsive to the information contained within the message start control register.

17. The device as recited in claim 16 wherein the message start control register is dynamically configured in response to signals from an external control means.

18. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, at least one of the station-to-highway sections comprising a bandwidth control register which contains information representative of an amount of information to be transferred to the information highways from the device, and a bandwidth control circuit which enables the transfer of a selected amount of information to the information highways from the device within a message frame responsive to the information contained within the bandwidth control register.

19. The device as recited in claim 18 wherein the bandwidth control register contains information representing a number of bits per frame, and wherein the bandwidth control circuit enables the same number of bits per message frame.

20. The device as recited in claim 18 wherein the bandwidth control register is dynamically configured in response to signals from an external control means.

21. The device as recited in claim 1 wherein at least one of the station-to-highway sections comprises a transfer enable control register which enables the transfer of information to information highways from the device responsive to information in the transfer enable control register.

22. The device as recited in claim 21 wherein the transfer enable control register is dynamically configured in response to signals from an external control means.

23. The device as recited in claim 1 further including synchronization circuitry adapted to synchronize transfer of information between the information highways and the station ports in relation to occurrences of beginning of information message frames on the highways.

24. The device as recited in claim 1 wherein each station-to-highway section includes a synchronization detector adapted to detect occurrences of a synchronization signal in a message from the station port.

25. The device as recited in claim 1 wherein the highway-to-station section further includes packet channel logic for transferring control and signaling information to the station port.

26. The device as recited in claim 25 wherein the control and signaling information transferred to the station port comprises information from an external control means.

27. The device as recited in claim 26 wherein the control and signaling information comprises a synchronization bit, a packet flag bit, a fill flag bit, and a plurality of packet data bits.

28. The device as recited in claim 1 wherein the station-to-highway section further includes packet channel logic for transferring control and signaling information from the station port.

29. The device as recited in claim 28 wherein the control and signaling information transferred from the station port comprises information which is communicated to an external control means.

30. The device as recited in claim 29 wherein the control and signaling information comprises a synchronization bit, a packet flag bit, a fill flag bit, and a plurality of packet data bits.

31. The device as recited in claim 1 wherein each highway-to-station section comprises a plurality of channels.

32. The device as recited in claim 1 wherein each station-to-highway section comprises a plurality of channels.

33. The device as recited in claim 1 wherein each station-to-highway section and each highway-to-station section comprise a plurality of channels, and wherein one channel of the station-to-highway section and one channel of the highway-to-station section share a common control register.

34. The device as recited in claim 33 wherein the common control register contains information indicating which one of the channels connected to the common control register is enabled.

35. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, each station-to-highway section and each highway-to-station section comprising a plurality of channels, one channel of the station-to-highway section and one channel of the highway-to-station section sharing a common control register, said common control register comprising:
 a highway selection control register which contains information representative of the information highways between which information is transferred; and
 a highway selection multiplexer which selects an information highway responsive to the information contained within the highway selection control register.

36. The device as recited in claim 35 wherein the highway selection control register is dynamically configured in response to signals from an external control means.

37. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, each station-to-highway section and each highway-to-station section comprising a plurality of channels, one channel of the station-to-highway section and one channel of the highway-to-station section sharing a common control register, said common control register comprising:
 a message start control register which contains information representative of a selected time relative to the beginning of a message frame at which the information is transferred between the selected information highways and the device; and
 a message start comparator circuit which enables the transfer of information between the selected highways and the device at said selected time responsive to the information contained within the message start control register.

38. The device as recited in claim 37 wherein the message start control register is dynamically configured in response to signals from an external control means.

39. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including control switches in switchable, electrical contact with said sections, said control switches being configurable to continuously communicate a variable bandwidth of information among said sections and also configurable to select an input to a highway-to-station section from at least one of said plurality of information highways and to select an output from a station-to-highway section to at least one of said plurality of information highways, each station-to-highway section and each highway-to-station section comprising a plurality of channels, one channel of the station-to-highway section and one channel of the highway-to-station section sharing a common control register, at least one of the switches comprising:
 a bandwidth control register which contains information representative of an amount of information to be transferred between the information highways and the device; and
 a bandwidth control circuit which enables the transfer of a selected amount of information between the information highways and the device responsive to the information contained within the bandwidth control register.

40. The device as recited in claim 39 wherein the bandwidth control register contains information representing the number of bits per frame and the bandwidth control circuit enables the same number of bits per message frame.

41. The device as recited in claim 39 wherein the bandwidth control register is dynamically configured in response to signals from an external control means.

42. The device as recited in claim 33 wherein at least one of the switches comprises a transfer enable control register which enables the transfer of information between information highways and the device responsive to information in the transfer enable control register.

43. The device as recited in claim 42 wherein the transfer enable control register is dynamically configured in response to signals from an external control means.

44. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including configurable control switches that communicate a variable bandwidth of information between and among the sections and also select the input and output of each station; wherein at least one of the highway-to-station sections comprises:

a highway selection control register which contains information representative of the information highways from which information is transferred;

a highway selection multiplexer which selects an information highway responsive to the information contained within the highway selection control register;

a message start control register which contains information representative of the time relative to the beginning of a message frame at which the information is transferred from selected information highways to the device;

a message start comparator circuit which enables the transfer of information from the selected highways to the device at a selected time;

a bandwidth control register which contains information representative of an amount of information to be transferred from the information highways to the device;

a bandwidth control circuit which enables the transfer of a selected amount of information from the information highways to the device responsive to the information contained within the bandwidth control register; and a transfer enable control register which enables the transfer of information from information highways to the device responsive to information in the transfer enable control register.

45. The device as recited in claim 44 wherein the highway selection control register, the message start control register, the bandwidth control register, and the transfer enable control register in the highway-to-station section is a control register unit which is dynamically configurable.

46. A switching device for transferring information between a plurality of information highways and between information highways and station ports, said device comprising a plurality of switches, each switch having a station-to-highway section and a highway-to-station section, each section being in electrical communication with a station port and with a plurality of information highways that may operate at one of a plurality of speeds, and each section including configurable control switches that communicate a variable bandwidth of information between the among the sections and also select the input and output of each station; wherein at least one of the station-to-highway sections comprises:

a highway selection control register which contains information representative of the information highways to which information is transferred;

a highway selection multiplexer which selects an information highway responsive to the information contained within the highway selection control register;

a message start control register which contains information representative of the time relative to the beginning of a message frame at which the information is transferred to selected information highways to the device;

a message start comparator circuit which enables the transfer of information to the selected highways from the device at a selected time;

a bandwidth control register which contains information representative of an amount of information to be transferred to the information highways from the device;

a bandwidth control circuit which enables the transfer of a selected amount of information to the information highways from the device responsive to the information contained within the bandwidth control register; and a transfer enable control register which enables the transfer of information to information highways from the device responsive to information in the transfer enable control register.

47. The device as recited in claim 46 wherein the highway selection control register, the message start control register, the bandwidth control register, and the transfer enable control register in the station-to-highway section is a control register unit which is dynamically configurable.

* * * * *